(12) United States Patent
Takahashi et al.

(10) Patent No.: US 6,678,376 B1
(45) Date of Patent: Jan. 13, 2004

(54) ECHO CANCELING APPARATUS

(75) Inventors: Shinya Takahashi, Tokyo (JP); Ikuo Kajiyama, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 522 days.

(21) Appl. No.: 09/641,891

(22) Filed: Aug. 18, 2000

(30) Foreign Application Priority Data

Dec. 7, 1999 (JP) .......................................... 11-348082

(51) Int. Cl.⁷ ............................................... H04M 9/08
(52) U.S. Cl. .............................. 379/406.01; 379/406.08; 379/406.02
(58) Field of Search ................................ 379/3, 392.01, 379/406.01, 406.02–406.14, 392, 390.02; 370/286, 287, 289, 290; 381/317, 318, 93, 94.1, 66, 71.11, 71.9, 71.12, 71.13

(56) References Cited

U.S. PATENT DOCUMENTS 3,787,645 A 1/1974 Ochiai et al.
4,757,527 A 7/1988 Beniston et al.
4,922,530 A 5/1990 Kenney et al.

FOREIGN PATENT DOCUMENTS

| EP | 0 627 840 | 12/1994 |
| JP | 9-148965 | 6/1997 |
| JP | 9-153848 | 6/1997 |
| JP | 9-181653 | 7/1997 |
| JP | 10-242891 | 9/1998 |

*Primary Examiner*—Rexford Barnie
(74) *Attorney, Agent, or Firm*—Oblon, Spivak, McClelland, Maier & Neustadt, P.C.

(57) ABSTRACT

The renewal of a group of first tap coefficients is controlled according to a reception signal, a transmission signal and a first error signal. In contrast, the renewal of a group of second tap coefficients is controlled according to only the reception signal. An echo canceled output signal is produced from the group of first tap coefficients in cases where an estimate precision of the group of first tap coefficients is higher than that of the group of second tap coefficients, and an echo canceled output signal is produced from the group of second tap coefficients in cases of the before-initial estimate, the echo path change and the infinite return loss. Accordingly, the echo canceled output signal, in which the echo is canceled, can be reliably produced regardless of the echo path change or the infinite return loss.

15 Claims, 9 Drawing Sheets

ECHO CANCELING APPARATUS

BACKGROUND OF THE INVENTION

1. Field of the Invention

The present invention relates to an echo canceling apparatus in which an echo occurring on a near-end caller's side is canceled in a system in which a speech communication is performed between the near-end caller and a far-end caller through a transmission path.

2. Description of Related Art

FIG. 10 is a block diagram showing the configuration of a conventional echo canceling apparatus disclosed in the Published Unexamined Japanese Patent Application No. H10-242891 (1998) as an example. In FIG. 10, 1 indicates a reception signal received from a far-end caller, 2 indicates a transmission signal transmitted from a near-end caller to the far-end caller, 3 indicates a first adaptive filter unit, 4 indicates a first subtracting unit, 5 indicates a second adaptive filter unit, 6 indicates a second subtracting unit, 7 indicates an adaptive filter control unit, 8 indicates a filter selecting unit, 9 indicates a, tap coefficient storing unit, 10 indicates a pseudo-echo producing unit, 11 indicates a third subtracting unit, 12 indicates a delaying unit, 13 indicates a delaying unit, and 14 indicates an echo canceled output signal.

Next, an operation of a conventional echo canceling apparatus is described.

In this apparatus, a group of first tap coefficients, a group of second tap coefficients and a group of third tap coefficients are used. The group of first tap coefficients is renewed by using a first convergence factor in the first adaptive filter unit 3 for each sample cycle. Also, a first pseudo-echo signal is produced by using the group of first tap coefficients and the reception signal 1 in the first adaptive filter unit 3 and is output to the first subtracting unit 4. In the first subtracting unit 4, the first pseudo-echo signal is subtracted from the transmission signal 2 to produce a first error signal, and the first error signal is output to the adaptive filter control unit 7. Also, the first error signal is returned to the first adaptive filter unit 3 to renew the group of first tap coefficients. The group of first tap coefficients of the first adaptive filter unit 3 is renewed according to an equation (1).

$$(Hk,j+1) = (Hk,j) + \mu \times E1j \times \{Xj-k\}/\alpha \quad (1)$$

Here the symbol k denotes a tap number (k=0,1, - - - ,N), the symbol j denotes a j-th time point, the symbol Hk,j denotes a tap coefficient of a k-th tap at the j-th time point, and the symbol Hk,j+1 denotes a tap coefficient of a k-th tap at the (j+1)-th time point. In other words, the symbol Hk,j+1 denotes a tap coefficient at a sample time point next to that of the tap coefficient Hk,j. Also, the symbol E1j denotes a value of the first error signal at the j-th time point, and the symbol Xj−k denotes the reception signal 1 at the (j−k)-th time point. The symbol $\mu$ is called a convergence factor and denotes a parameter for determining a convergence speed of each tap coefficient. In cases where the convergence factor $\mu$ is heightened, the convergence speed of the group of first tap coefficients is heightened. In contrast, in cases where the convergence factor $\mu$ is lowered, the convergence speed of the group of first tap coefficients is lowered. A factor $\alpha$ is indicated according to an equation (2).

$$\alpha = \sum_{i=0}^{N} |Xi|/N \quad (2)$$

The symbol N denotes the number of tap coefficients.

The second group of tap coefficients is renewed by using a second convergence factor lower than the first convergence factor in the second adaptive filter unit 5 for each sample cycle according to the equation (1) in the same manner as the renewal of the group of first tap coefficients. Also, a second pseudo-echo signal is produced by using the group of second tap coefficients and the reception signal 1 in the second adaptive filter unit 5 and is output to the second subtracting unit 6. In the second subtracting unit 6, the second pseudo-echo signal is subtracted from the transmission signal 2 to produce a second error signal, and the second error signal is output to the adaptive filter control unit 7. Also, the second error signal is returned to the second adaptive filter unit 5 to renew the group of second tap coefficients.

Also, one group of tap coefficients is selected in the filter selecting unit 8 from the group of first tap coefficients of the first adaptive filter unit 3, the group of second tap coefficients of the second adaptive filter unit 5 and a group of tap coefficients stored in the tap coefficient storing unit 9, and the selected group of tap coefficients is stored in the tap coefficient storing unit 9 as a group of third tap coefficients.

In the adaptive filter control unit 7, the first error signal, the second error signal, the reception signal 1 and the transmission signal 2 are input for each sample cycle (or each sample period), an average power level of M samples of each signal is calculated for each tap coefficient selection cycle corresponding to M sample cycles, selection information is determined according to equations (3) to (6) and four selection conditions, and the selection information is output to the filter selecting unit 8 to select one group of tap coefficients from the group of first tap coefficients, the group of second tap coefficients and the group of third tap coefficients of the tap coefficient storing unit 9.

$$X < p1 \quad (3)$$
$$S > p2 \times X \text{ (here, } p2 \leq 0.5\text{)} \quad (4)$$
$$P3 \times |E1| > |E2| \quad (5)$$
$$P4 \times |E2| > |S| \quad (6)$$

Here the symbol S denotes an average power level (which indicates a root-mean-square level or an average amplitude level) of the transmission signal 2, the symbol X denotes an average power level of the reception signal 1, the symbol E1 denotes an average power level of the first error signal, and the symbol E2 denotes an average power level of the second error signal. Also, the symbols p1, p2, p3 and p4 are respectively a constant and are determined according to environmental conditions of the conventional echo canceling apparatus.

The selection conditions of one group of tap coefficients using the equations (3) to (6) are as follows.

First Selection Condition: the equation (3) is satisfied, or the equation (4) is satisfied on condition that the equation (3) is not satisfied. In this case, the group of third tap coefficients of the tap coefficient storing unit 9 is selected.

Second Selection Condition: the equation (5) is satisfied on condition that either the equation (3) or the equation (4) is not satisfied. In this case, the group of first tap coefficients is selected.

Third Selection Condition: the equation (6) is satisfied on condition that each of the equations (3), (4) and (5) is not satisfied. In this case, the group of second tap. coefficients is selected.

Fourth Selection Condition: each of the equations (3), (4), (5) and (6) is not satisfied. In this case, the group of third tap coefficients of the tap coefficient storing unit 9 is selected.

In the pseudo-echo producing unit 10, a third pseudo-echo signal is produced by using the group of third tap coefficients stored in the tap coefficient storing unit 9 and the reception signal 1 delayed in the delaying unit 13, and the third pseudo-echo, signal is output to the third subtracting unit 11. In the third subtracting unit 11, the third pseudo-echo signal is subtracted from the transmission signal 2 delayed in the delaying unit 12 to produce an echo canceled output signal 14, and the echo canceled output signal 14 is output to the far-end caller.

Echo canceling apparatuses similar to the above-described conventional echo canceling apparatus are disclosed in the Published Unexamined Japanese Patent Application No. H9-148965 (1997) and the Published Unexamined Japanese Patent Application No. H9-181653 (1997).

However, because the conventional echo canceling apparatus has the above-described configuration, there are following problems.

(First Problem)

It is required to determine the value of the constant p2 used in the equation (4) in advance according to environmental conditions of an echo path used in the conventional echo canceling apparatus. Therefore, the control of the adaptive filter control unit 7 is available only for the echo path environmental conditions corresponding to the value of the constant p2.

(Second Problem)

Because the group of tap coefficients is always renewed for each sample cycle in the first adaptive filter unit 3 and the second adaptive filter unit 5, when either the reception signal 1 or the transmission signal 2 is not input, when only the transmission signal 2 is input or when the reception signal 1 and the transmission signal 2 are input (a double-talk), the group of first tap coefficients of the first adaptive filter unit 3 and the group of second tap coefficients of the second adaptive filter unit 5 deteriorate. In particular, in the double-talk, in cases where the deterioration degree of the group of tap coefficients reaches a certain value, there is a possibility that the average power level of the first error signal becomes lower than that of the second error signal. In this case, the second selection condition is satisfied, the deteriorating group of first tap coefficients is undesirably selected, the deteriorating group of first tap coefficients is stored in the tap coefficient storing unit 9 as a deteriorating group of third tap coefficients, and the third pseudo-echo signal output from the pseudo-echo generating unit 10 according to the deteriorating group of third tap coefficients of the tap coefficient storing unit 9 greatly differs from an ideal pseudo-echo signal which cancels an echo included in the transmission signal 1. Therefore, there is a possibility that an echo included in the transmission signal 1 is amplified in the echo canceled output signal 14 on the contrary.

(Third Problem)

In cases where the value M corresponding to the tap coefficient selection cycle is set to a low value, the number of renewal operations for the group of tap coefficients performed in the first and second adaptive filter units 3 and 5 in one tap coefficient selection cycle becomes small. Therefore, the precision for estimating a group of ideal tap coefficients by renewing the group of first tap coefficients becomes almost the same as that for estimating a group of ideal tap coefficients by renewing the group of second tap coefficients, so that the average power levels of the transmission signal 2, the first error signal and the second error signal become almost the same as each other. In this case, either the second selection condition or the third selection condition is not satisfied, but the fourth selection condition is always satisfied. Therefore, the group of third tap coefficients stored in the tap coefficient storing unit 9 is always selected to produce the echo canceled output signal 14, and there is a probability that the estimate of the ideal group of tap coefficients to be used to efficiently cancel an echo existing in the transmission signal 2 is not advanced. In contrast, in cases where the value M is set to a high value to reliably estimate the group of ideal tap coefficients, it is required to prolong a delay time set in the delaying units 12 and 13 according to the value M set to a high value, and the delay time of the echo canceled output signal 14 becomes long. In this case, there is a probability that the far-end caller receiving the echo canceled output signal 14 feels strange in a speech communication with the near-end caller. Also, as the delay time of the echo canceled output signal 14 is lengthened, it is required to enlarge a memory capacity required to store the reception signal 1 and the transmission signal 2 delayed in the delaying units 12 and 13, so that memory sizes of the delaying units 12 and 13 become large.

(Fourth Problem)

It is required to store the of group of first tap coefficients having a large volume, the group of second tap coefficients having a large volume and the group of third tap coefficients having a large volume in the first adaptive filter unit 3, the second adaptive filter unit 5 and the tap coefficient storing unit 9. Therefore, a memory capacity required to store the group of first tap coefficients, the group of second tap coefficients and the group of third tap coefficients becomes large, so that a size of the conventional echo canceling apparatus becomes large.

SUMMARY OF THE INVENTION

An object of the present invention is to provide, with due consideration to the problems of the conventional echo canceling apparatus, an echo canceling apparatus in which the degradation of an echo canceling performance is suppressed while giving no delaying time to an echo canceled output signal and making a size of the echo canceling apparatus small.

The object is achieved by the provision of an echo canceling apparatus, in which an echo canceled output signal is produced from a reception signal, a transmission signal, a first error signal produced from the reception signal and the transmission signal and a second error signal produced from the reception signal and the transmission signal and is output, comprising:

first adaptive filter renewal control means for receiving the first error signal, the reception signal and the transmission signal and judging according to a first renewal judging method based on the first error signal, the reception signal and the transmission signal whether or not a first tap coefficient is to be renewed;

first adaptive filter means for receiving the first error signal and the reception signal, renewing the first tap coefficient according to the first error signal and the reception signal, in cases where the renewal of the first tap coefficient is judged by the first adaptive filter renewal control means, and producing a first pseudo-echo signal from the first tap coefficient;

first subtracting means for subtracting the first pseudo-echo signal produced by the first adaptive filter means from the transmission signal to produce the first error signal as the echo canceled output signal equivalent to the transmission signal in which an echo component is canceled;

second adaptive filter renewal control means for receiving the reception signal and judging according to a second renewal judging method, which is based on the reception signal and differs from the first renewal judging method, whether or not a second tap coefficient is to be renewed;

second adaptive filter means for receiving the second error signal and the reception signal, renewing the second tap coefficient according to the second error signal and the reception signal, in cases where the renewal of the second tap coefficient is judged by the second adaptive filter renewal control means, and producing a second pseudo-echo signal from the second tap coefficient;

second subtracting means for subtracting the second pseudo-echo signal produced by the second adaptive filter means from the transmission signal to produce the second error signal equivalent to the transmission signal in which the echo component is canceled; and adaptive filter selecting means for receiving the reception signal, the transmission signal, the first error signal produced by the first subtracting means, the second error signal produced by the second subtracting means and the second tap coefficient of the second adaptive filter means and controlling the first adaptive filter means according to a level relationship among the reception signal, the transmission signal, the first error signal and the second error signal to replace the first tap coefficient of the first adaptive filter means with the second tap coefficient.

In the above configuration, because the first adaptive filter renewal control means judges according to the first error signal, the reception signal and the transmission signal whether or not the first tap coefficient of first adaptive filter means is to be renewed, the first tap coefficient is stably converged, and a deterioration degree of the first tap coefficient is reduced in a double talk state. In contrast, because the second adaptive filter renewal control means judges according to only the reception signal whether or not the second tap coefficient of second adaptive filter means is to be renewed, though a deterioration degree of the second tap coefficient is high in the double talk state, the second tap coefficient is rapidly converged in a state in which only the echo component exists in the transmission signal.

Therefore, the echo canceled output signal is produced from the first tap coefficient stably converged in the only echo component state. In contrast, in case of a before-initial estimate, an echo, path changes or an infinite return loss, because a rapid convergence of the tap coefficient is required, the adaptive filter selecting means controls the first adaptive filter means to replace the first tap coefficient of the first adaptive filter means with the second tap coefficient, and the echo canceled output signal is produced from the second tap coefficient rapidly converged.

Accordingly, because the echo canceled output signal produced from the first tap coefficient stably converged in the only echo component state can be produced and because the echo canceled output signal produced from the second tap coefficient rapidly converged can be produced in case of the before-initial estimate, an echo path change or an infinite return loss, the echo canceled output signal equivalent to the transmission signal, in which the echo component is canceled according to the highly estimated tap coefficient relating to the production of the echo canceled output signal, is always produced and output regardless of the echo path change or the infinite return loss. Also, the echo canceling apparatus not depending on an echo path environment can be manufactured in a small size without amplifying the echo included in the transmission signal. Also, the echo canceling apparatus, in which the echo canceled output signal is output without any delaying time, can be obtained.

Also, the object is achieved by the provision of an echo canceling apparatus, in which an echo canceled output signal is produced from a reception signal, a transmission signal, a first error signal produced from the reception signal and the transmission signal and a second error signal produced from the reception signal and the transmission signal and is output, comprising:

first adaptive filter renewal control means for receiving the reception signal and judging according to the reception signal whether or not a first tap coefficient is to be renewed;

first adaptive filter means for receiving the first error signal and the reception signal, renewing the first tap coefficient according to a first tap coefficient renewal algorithm based on the first error signal and the reception signal, in cases where the renewal of the first tap coefficient is judged by the first adaptive filter renewal control means, and producing a first pseudo-echo signal from the first tap coefficient;

first subtracting means for subtracting the first pseudo-echo signal produced by the first adaptive filter means from the transmission signal to produce the first error signal as the echo canceled output signal equivalent to the transmission signal in which an echo component is canceled;

second adaptive filter renewal control means for receiving the reception signal and judging according to a second renewal judging method based on the reception signal whether or not a second tap coefficient is to be renewed;

second adaptive filter means for receiving the second error signal and the reception signal, renewing the second tap coefficient according to a second tap coefficient renewal algorithm, which is based on the second error signal and the reception signal and differs from the first tap coefficient renewal algorithm used by the first adaptive filter means, in cases where the renewal of the second tap coefficient is judged by the second adaptive filter renewal control means, and producing a second pseudo-echo signal from the second tap coefficient;

second subtracting means for subtracting the second pseudo-echo signal produced by the second adaptive filter means from the transmission signal to produce the second error signal equivalent to the transmission signal in which the echo component is canceled; and adaptive filter selecting means for receiving the reception signal, the transmission signal, the first error signal produced by the first subtracting means, the second error signal produced by the second subtracting means and the second tap coefficient of the second adaptive filter means and controlling the first adaptive filter means according to a level relationship among the reception signal, the transmission signal, the first error signal and the second error signal to replace the first tap coefficient of the first adaptive filter means with the second tap coefficient.

In the above configuration, because the first tap coefficient is renewed according to the first tap coefficient renewal algorithm in the first adaptive filter means, the first tap coefficient is stably converged, and a deterioration degree of the first tap coefficient is reduced in a double talk state. In contrast, because the second tap coefficient is renewed according to the second tap coefficient renewal algorithm differing from the first tap coefficient renewal algorithm in the second adaptive filter means, though a deterioration degree of the second tap coefficient is high in the double talk state, the second tap coefficient is rapidly converged in a state in which only the echo component exists in the transmission signal.

Accordingly, in the echo canceling apparatus, the echo canceled output signal equivalent to the transmission signal, in which the echo component is canceled according to the highly estimated tap coefficient relating to the production of the echo canceled output signal, is always produced and output regardless of an echo path change or an infinite return loss. Also, the echo canceling apparatus not depending on an echo path environment can be manufactured in a small size without amplifying the echo component included in the transmission signal. Also, the echo canceling apparatus, in which the echo canceled output signal is output without any delaying time, can be obtained.

It is preferred that a first tap coefficient renewal algorithm used for the renewal of the first tap coefficient of the first adaptive filter means differs from a second tap coefficient renewal algorithm used for the renewal of the second tap coefficient of the second adaptive filter means.

Therefore, the renewal of the tap coefficient corresponding to the production of the echo canceled output signal is not stopped regardless of the echo path change or the infinite return loss. Also, the echo canceling apparatus not depending on an echo path environment can be manufactured in a small size without amplifying the echo included in the transmission signal. Also, the echo canceled output signal is output without any delaying time.

It is preferred that the adaptive filter selecting means receives the first tap coefficient of the first adaptive filter means in addition to the reception signal, the transmission signal, the first error signal, the second error signal and the second tap coefficient, and the adaptive filter selecting means controls the first adaptive filter means according to a first level relationship among the reception signal, the transmission signal, the first error signal and the second error signal to replace the first tap coefficient of the first adaptive filter means with the second tap coefficient or controls the second adaptive filter means according to a second level relationship among the reception signal, the transmission signal, the first error signal and the second error signal to replace the second tap coefficient of the second adaptive filter means with the first tap coefficient.

Therefore, the convergence speed of the second tap coefficient in a time-period after the double talk state can be moreover heightened.

It is also preferred that the adaptive filter selecting means controls the first adaptive filter means to replace the first tap coefficient of the first adaptive filter means with the second tap coefficient according to a linear interpolation based on a time transition.

Therefore, the discontinuity occurring in the echo canceled output signal in the replacement of the tap coefficient can be reduced.

It is also preferred that the echo canceling apparatus further comprising:

error signal buffer control means for receiving a judging result indicating the replacement of the first tap coefficient of the first adaptive filter means with the second tap coefficient or a judging result indicating the replacement of the second tap coefficient of the second adaptive filter means with the first tap coefficient from the adaptive filter selecting means and producing a first multiplication factor and a second multiplication factor according to the received judging result;

first multiplying means for multiplying the first error signal produced by the first subtracting means by the first multiplication factor produced by the error signal buffer control means to produce a first multiplied error signal;

second multiplying means for multiplying the second error signal produced by the second subtracting means by the second multiplication factor produced by the error signal buffer control means to produce a second multiplied error signal; and adding means for adding the first multiplied error signal produced by the first multiplying means and the second multiplied error signal produced by the second multiplying means together to obtain a sum of the first multiplied error signal and the second multiplied error signal and outputting the sum as the echo canceled output signal.

Therefore, the discontinuity occurring in the echo canceled output signal in the replacement of the tap coefficient can be reduced while reducing a calculation volume required in the tap coefficient replacement.

It is also preferred that a value of a convergence factor used for the renewal of the first tap coefficient of the first adaptive filter means differs from that used for the renewal of the second tap coefficient of the second adaptive filter means.

Therefore, the echo canceled output signal, in which the echo component is reliably canceled, can be moreover stably obtained. Also, the convergence speed of the second tap coefficient can be moreover improved in the only echo component state, even though the echo path change or the infinite return loss occurs, the estimate of the second tap coefficient can be moreover rapidly performed, and the echo canceled output signal, in which the echo component is removed from the transmission signal, can be always obtained stably regardless of the echo path change or the infinite return loss.

It is also preferred that a length of the first tap coefficient of the first adaptive filter means differs from that of the second tap coefficient of the second adaptive filter means.

Therefore, the echo canceled output signal, in which the echo component is reliably canceled, can be moreover stably obtained. Also, the echo canceled output signal, in which the echo component is removed from the transmission signal, can be always obtained stably regardless of the echo path change or the infinite return loss.

DETAILED DESCRIPTION OF THE PREFERRED EMBODIMENTS

The invention will now be described with reference to the accompanying drawings.

Embodiment 1

Figure 1:
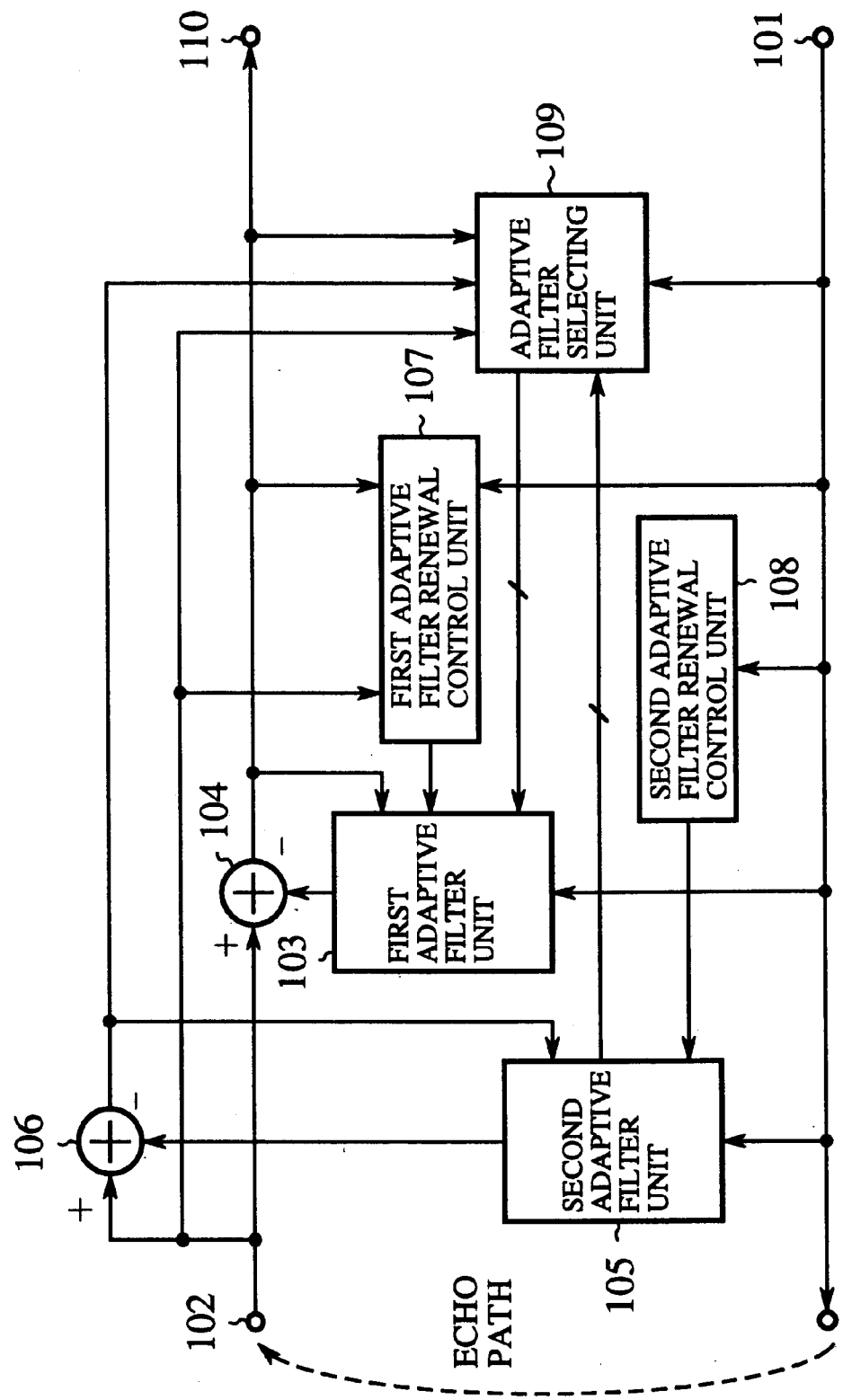
FIG. 1 is a block diagram showing the configuration of an echo canceling apparatus according to a first embodiment of the present invention.

FIG. 1 is a block diagram showing the configuration of an echo canceling apparatus according to a first embodiment of the present invention. In FIG. 1, 101 indicates a reception signal terminal at which a reception signal denoting a far-end caller's voice transmitted to a near-end caller through a transmission path (not shown) is received. 102 indicates a transmission signal terminal at which a transmission signal of the near-end caller to be transmitted to the far-end caller is received. In the transmission signal, an echo signal occurring when the reception signal passes through an echo path is superposed on a near-end component denoting a near-end caller's voice.

Also, 103 indicates a first adaptive filter unit for receiving the reception signal and a first error signal produced in a first subtracting unit described later, renewing a group of first tap coefficients according to the reception signal and the first error signal in cases where the renewal of the group of first tap coefficients is judged in a first adaptive filter renewal control unit described later, and producing a first pseudo-echo signal by using the group of first tap coefficients. 104 indicates the first subtracting unit for receiving the first pseudo-echo signal from the first adaptive filter unit 103, receiving the transmission signal, subtracting the first pseudo-echo signal from the transmission signal to produce the first error signal equivalent to the transmission signal in which an echo component indicated by the echo signal is canceled, and outputting the first error signal as an echo canceled output signal. 105 indicates a second adaptive filter unit for receiving the reception signal and a second error signal produced in a second subtracting unit described later, renewing a group of second tap coefficients according to the reception signal and the second error signal in cases where the renewal of the group of second tap coefficients is judged in a second adaptive filter renewal control unit described later, and producing a second pseudo-echo signal by using the group of second tap coefficients. 106 indicates the second subtracting unit for receiving the second pseudo-echo signal from the second adaptive filter unit 105, receiving the transmission signal, and subtracting the second pseudo-echo signal from the transmission signal to produce the second error signal equivalent to the transmission signal in which the echo component indicated by the echo signal is canceled.

107 indicates the first adaptive filter renewal control unit for receiving the reception signal, the transmission signal and the first error signal output from the first subtracting unit 104, judging according to a first renewal judging method using the reception signal, the transmission signal and the first error signal whether or not the renewal of the group of first tap coefficients is to be performed, and outputting a first control signal indicating a judging result to the first adaptive filter unit 103. 108 indicates the second adaptive filter renewal control unit for receiving the reception signal, judging according to a second renewal judging method using only the reception signal whether or not the renewal of the group of second tap coefficients is to be performed, and outputting a second control signal indicating a judging result to the second adaptive filter unit 105. 109 indicates an adaptive filter selecting unit for receiving the reception signal, the transmission signal, the first error signal output from the first subtracting unit 104, the second error signal output from the second subtracting unit 106 and the group of second tap coefficients of the second adaptive filter unit 105, judging according to a relationship of average power levels of the reception signal, the transmission signal, the first error signal and the second error signal whether or not the group of first tap coefficients is to be replaced with the group of second tap coefficients, and outputting the group of second tap coefficients to the first adaptive filter unit 103 to replace the group of first tap coefficients of the first adaptive filter unit 103 with the group of second tap coefficients. 110 indicates an output signal terminal from which the echo canceled output signal output from the first subtracting unit 104 as the first error signal is output.

Next, an operation of the echo canceling apparatus according to the first embodiment is described.

In the first adaptive filter unit 103, the group of first tap coefficients is held, the reception signal and the first error signal produced in the first subtracting unit 104 are received, and the group of first tap coefficients is renewed according to the reception signal and the first error signal. In the first embodiment, the least mean square (LMS) algorithm is, for example, used as a tap coefficient renewal algorithm using an adaptive filter to renew the group of first tap coefficients. Therefore, the group of first tap coefficients is renewed according to the LMS algorithm in the first adaptive filter unit 103 to make the group of first tap coefficients approximate to an impulse response of the echo path on the near-end caller side. The renewal of the group of first tap coefficients in the first-adaptive filter unit 103 is controlled according to the first control signal output from the first adaptive filter renewal control unit 107. Also, the first pseudo-echo signal is produced in the first adaptive filter unit 103 by performing a convolution calculation using the group of first tap coefficients and the reception signal.

In this embodiment, the renewal of the group of first tap coefficients using the LMS algorithm is described. However, another tap coefficient renewal algorithm such as Karman algorithm can be used in place of the LMS algorithm, and the same effect as that in the LMS algorithm can be obtained.

In the first subtracting unit 104, the first pseudo-echo signal output from the first adaptive filter unit 103 is subtracted from the transmission signal to produce the first error signal. The first error signal is input to the first adaptive filter unit 103, the first adaptive filter renewal control unit 107 and the adaptive filter selecting unit 109. Also, the first error signal is output as the echo canceled output signal from the output signal terminal 110 to the far-end caller through the transmission path (not shown).

In the second adaptive filter unit 105, the group of second tap coefficients is held, the reception signal and the second error signal produced in the second subtracting unit 106 are received, and the group of second tap coefficients is renewed according to the reception signal and the second error signal. In the renewal of the group of second tap coefficients, the LMS algorithm is, for example, used in the same manner as in the renewal of the group of first tap coefficients. The renewal of the group of second tap coefficients in the second adaptive filter unit 105 is controlled according to the second control signal output from the second adaptive filter renewal control unit 108. Also, the second pseudo-echo signal is produced in the second adaptive filter unit 105 by performing a convolution calculation using the group of second tap coefficients and the reception signal.

In the second subtracting unit 106, the second pseudo-echo signal output from the second adaptive filter unit 105 is subtracted from the transmission signal to produce the second error signal. The second error signal is input to the second adaptive filter unit 105 and the adaptive filter selecting unit 109.

In the first adaptive filter renewal control unit 107, the judgment whether or not the renewal of the group of first tap coefficients is to be performed in the first adaptive filter unit 103 is performed according to a first renewal judging method using the reception signal, the transmission signal and the first error signal output from the first subtracting unit 104, and the first control signal indicating that the renewal of the group of first tap coefficients is necessary or unnecessary is produced and output to the first adaptive filter unit 103. The first renewal judging method is described later in detail.

In the second adaptive filter renewal control unit 108, the judgment whether or not the renewal of the group of second tap coefficients is to be performed in the second adaptive filter unit 105 is performed according to a second renewal judging method using only the reception signal, and the second control signal indicating that the renewal of the group of second tap coefficients is necessary or unnecessary is produced and output to the second adaptive filter unit 105. The second renewal judging method differing from the first renewal judging method is described later in detail.

In the adaptive filter selecting unit 109, the judgment whether or not a degree of estimate precision of the group of second tap coefficients renewed in the second adaptive filter unit 105 is higher than that of the group of first tap coefficients renewed in the first adaptive filter unit 103 is performed according to a relationship of average power levels of the reception signal, the transmission signal, the first error signal output from the first subtracting unit 104 and the second error signal output from the second subtracting unit 106. In cases where it is judged that a degree of estimate precision of the group of second tap coefficients is higher than that of the group of first tap coefficients, the group of second tap coefficients of the second adaptive filter unit 105 is output to the first adaptive filter unit 103. In cases where the group of second tap coefficients transmitted from the adaptive filter selecting unit 109 is received in the first adaptive filter unit 103, the group of first tap coefficients is replaced with the group of second tap coefficients in the first adaptive filter unit 103 to produce the first pseudo-echo signal according to the group of second tap coefficients. This judgment is described later in detail.

Next, the first and second renewal judging methods performed in the first adaptive filter renewal control unit 107 and the second adaptive filter renewal control unit 108 are described in detail.

In cases where the voice of the near-end caller and the voice of the far-end caller exist (double talk), the transmission signal includes both the echo component of the echo signal and the near-end signal component denoting the voice of the near-end caller. The echo signal occurs when the reception signal received at the reception signal terminal 101 passes through the echo path. Also, in cases where only the voice of the far-end caller exists (no voice of the near-end caller, only the echo component exists in the transmission signal.

In the first adaptive filter renewal control unit 107, it is detected whether or not only the echo component exists in the transmission signal. In cases where it is judged that only the echo component exists in the transmission signal (no existence of the near-end signal component), the first adaptive filter renewal control unit 107 controls the first adaptive filter unit 103 to renew the group of first tap coefficients. Also, in the second adaptive filter renewal control unit 108, it is detected whether or not the echo component exists in the transmission signal (the existence of the near-end signal component is unknown). In cases where the echo component exists in the transmission signal, the second adaptive filter renewal control unit 108 controls the second adaptive filter unit 105 to renew the group of second tap coefficients.

In contrast, in cases where only the near-end signal component exists in the transmission signal because no voice of the far-end caller is received, or in cases where both the echo component and the near-end signal component exists in the transmission signal (double talk), the estimate of the first and second tap coefficients cannot be correctly performed in the first adaptive filter unit 103 and the second adaptive filter unit 105. In this case, assuming that the group of first tap coefficients or the group of second tap coefficients is renewed, the group of first or the group of second tap coefficients deteriorates, the echo component of the transmission signal is not canceled in the echo canceled output signal, but there is a probability that the echo component of the transmission signal is amplified in the echo canceled output signal. Therefore, in the case of only the near-end signal component or the double talk, the renewal of the group of first tap coefficients in the first adaptive filter unit 103 is stopped under the control of the first adaptive filter renewal control unit 107.

The control of the first adaptive filter renewal control unit 107 and the second adaptive filter renewal control unit 108 performed to stop the renewal of the first and second tap coefficients is described. In cases where no echo component exists in the transmission signal because no voice of the far-end caller is received, an equation (7) is satisfied.

$$X < p1 \qquad (7)$$

In cases where both the echo component and the near-end signal component exists in the transmission signal (double talk), an equation (8) is satisfied.

$$En1 \times p5 > S \qquad (8)$$

Here the symbol X denotes an average power level of K samples of the reception signal, the symbol S denotes an average power level of K samples of the transmission signal, the symbol En1 denotes an average power level of K samples of the first error signal, and the symbols p1 and p5 respectively denote a constant. The value of the constant p5 is higher than that of the constant p4 of the equation (6).

Also, two renewal conditions are prescribed.

Renewal Condition 1: a case that the equation (7) is satisfied.

Renewal Condition 2: a case that the equation (8) is satisfied on condition that the equation (7) is not satisfied.

The Renewal Condition 1 and the Renewal Condition 2 are judged in the first adaptive filter renewal control unit 107. In cases where the Renewal Condition 1 or the Renewal Condition 2 is satisfied, the renewal of the group of first tap coefficients is stopped under the control of the first adaptive filter renewal control unit 107.

In contrast, only the Renewal Condition 1 is judged in the second adaptive filter renewal control unit 108 because only the reception signal is received in the second adaptive filter renewal control unit 108. In cases where the Renewal Condition 1 is satisfied, the renewal of the group of second tap coefficients is stopped under the control of the second adaptive filter renewal control unit 108.

Because the constant p5 of the equation (8) used only for the first adaptive filter renewal control unit 107 is set to the value higher than that of the constant p4 of the equation (6), the renewal of the group of first tap coefficients is performed in the first adaptive filter unit 103 only in the case where the average power level S of the transmission signal is considerably higher than the average power level En1 of the first error signal (in other words $S/En1 \geq p5 > p4$). In this case, even though the average power level S of the transmission signal becomes higher than the average power level En1 of the first error signal in a double talk state, because the constant p5 is higher than the constant p4, there is little probability that the renewal of the group of first tap coefficients is performed in the double talk state. Therefore, there is no probability that the group of first tap coefficients is renewed in the double talk state to make the group of first tap coefficients considerably deteriorate, there is no probability that the group of first tap coefficients is diverged, and the group of first tap coefficients is stably converged.

Accordingly, because the first pseudo-echo signal is produced in the first adaptive filter unit 103 from the reception signal and the group of first tap coefficients stably converged, the first error signal produced by subtracting the first pseudo-echo signal from the transmission signal in the first subtracting unit 104 is always stable, there is no probability that the echo existing in the transmission signal is amplified, and the echo canceled output signal equivalent to the transmission signal in which an echo is reliably canceled, can be stably obtained.

However, because it takes a long time to sufficiently converge the group of first tap coefficients in an initial estimating time-period, the estimate of the group of first tap coefficients is not sufficient in the initial estimating time-period. Also, when the echo path changes, values of the group of first tap coefficients to be estimated changes. In case of the insufficient estimate of the group of first tap coefficients or the change of the group of first tap coefficients to be estimated, even though only the echo component is included in the transmission signal, a double talk state is erroneously detected in the first adaptive filter renewal control unit 107 because of the satisfaction of the equation (8), so that there is a probability that the renewal of the group of first tap coefficients in the first adaptive filter unit 103 is stopped because the Renewal Condition 2 is satisfied. In particular, because the constant p5 of the equation (8) is set to the value higher than that of the constant p4 of the equation (6), the probability that the renewal of the group of first tap coefficients is stopped because of the erroneous double talk detection is heightened. Therefore, even though the echo canceled output signal, in which an echo of the transmission signal is reliably canceled, is stably obtained in a case other than the initial estimating time-period or the change of the echo path, there is a probability that the renewal of the group of first tap coefficients is frequently stopped, so that the estimate of the group of first tap coefficients becomes insufficient. In this case, there is a probability that the echo component included in the transmission signal cannot be canceled indefinitely by the cooperation of the first adaptive filter unit 103 with the first adaptive filter renewal control unit 107. To solve this problem, the second adaptive filter unit 105, the second adaptive filter renewal control unit 108 and the adaptive filter selecting unit 109 are operated.

In the second adaptive filter renewal control unit 108, the judgment whether or not the renewal of the group of second tap coefficients is to be performed in the second adaptive filter unit 105 is performed according to the equation (7). Therefore, in cases where the reception signal is in a voiced state, the group of second tap coefficients is always renewed in the second adaptive filter unit 105. In this case, when the echo canceling apparatus is in a double talk state because of the existence of the near-end signal component, there is a probability that the group of second tap coefficients deteriorates in the renewal performed in the double talk state. However, when only the echo component exists in the transmission signal, because the group of second tap coefficients can be always renewed in the second adaptive filter unit 105 in a state of th e only existence of the echo component, the group of second tap coefficients can be rapidly converged as compared with the convergence of the group of first tap coefficients.

In the first embodiment, the equations (7) and (8), the Renewal Condition 1 and the Renewal Condition 2 are used for a first adaptive filter renewal control method performed in the first adaptive filter renewal control unit 107, and the equation (7) and the Renewal Condition 1 are used for a second adaptive filter renewal control method performed in the second adaptive filter renewal control unit 108. However, it is applicable that another adaptive filter renewal control method be used in the first adaptive filter renewal control unit 107 on condition that the double talk state is correctly detected and the judgment of the renewal of the group of first tap coefficients is performed with high efficiency. Also, it is applicable that another adaptive filter renewal control method be used in the second adaptive filter renewal control unit 108 on condition that the group of second tap coefficients is rapidly converged.

Next, the operation of the adaptive filter selecting unit 109 is described in detail. In the adaptive filter selecting unit 109, either the group of first tap coefficients stably converged or the group of second tap coefficients rapidly converged is selected by using four equations (9) to (12). In cases where the group of second tap coefficients is selected as a judging result of the adaptive filter selecting unit 109, the first adaptive filter unit 103 receives the group of second tap coefficients from the adaptive filter selecting unit 109, and the group of first tap coefficients is replaced with the group of second tap coefficients in the first adaptive filter unit 103.

$$Xn(i) > p1 \tag{9}$$

$$En2(i) \times p5 < Sn(i) \tag{10}$$

$$En1(i) \times p6 < Sn(i) \quad (11)$$

$$En1(i) < En2(i) \times p7 \quad (12)$$

Here the symbol Xn(i) denotes an average power level of K samples of the reception signal at a time i, the symbol Sn(i) denotes an average power level of K samples of the transmission signal at the time i, the symbol En1(i) denotes an average power level of K samples of the first error signal at the time i, the symbol En2(i) denotes an average power level of K samples of the second error signal at the time i, the symbols p1, p5, p6 and p7 are respectively a constant, and the constants p5, p6 and p7 are respectively equal to or higher than 1.

Also, a before-initial estimate mode and an after-initial estimate mode are prepared in the adaptive filter selecting unit 109. In a case where an echo canceling operation is started, the before-initial estimate mode is selected. Because the constant p5 used in the equation (8) is set to a high value in the first adaptive filter renewal control unit 107, even though only the echo component exists in the transmission signal, there is a high probability that the echo canceling apparatus is in a double talk state, so that the renewal of the group of first tap coefficients is hardly performed in the first adaptive filter unit 103 in a before-initial estimate. In contrast, the group of second tap coefficients is rapidly renewed in the second adaptive filter unit 105 in the before-initial estimate. Therefore, to replace the group of first tap coefficients with the group of converged second tap coefficients as soon as possible, in cases where the equations (9) and (10) are satisfied, it is judged in the adaptive filter selecting unit 109 that only the echo component exists in the transmission signal, and the replacement of the group of first tap coefficients of the first adaptive filter unit 103 with the group of second tap coefficients of the second adaptive filter unit 105 is determined in the adaptive filter selecting unit 109. In cases where the equation (10) is satisfied, the adaptive filter selecting unit 109 detects that the average power level Sn(i) of the transmission signal is considerably higher than the average power level En2(i) of the second error signal, so that the adaptive filter selecting unit 109 can judge that the group of second tap coefficients is sufficiently estimated.

Figure 10:
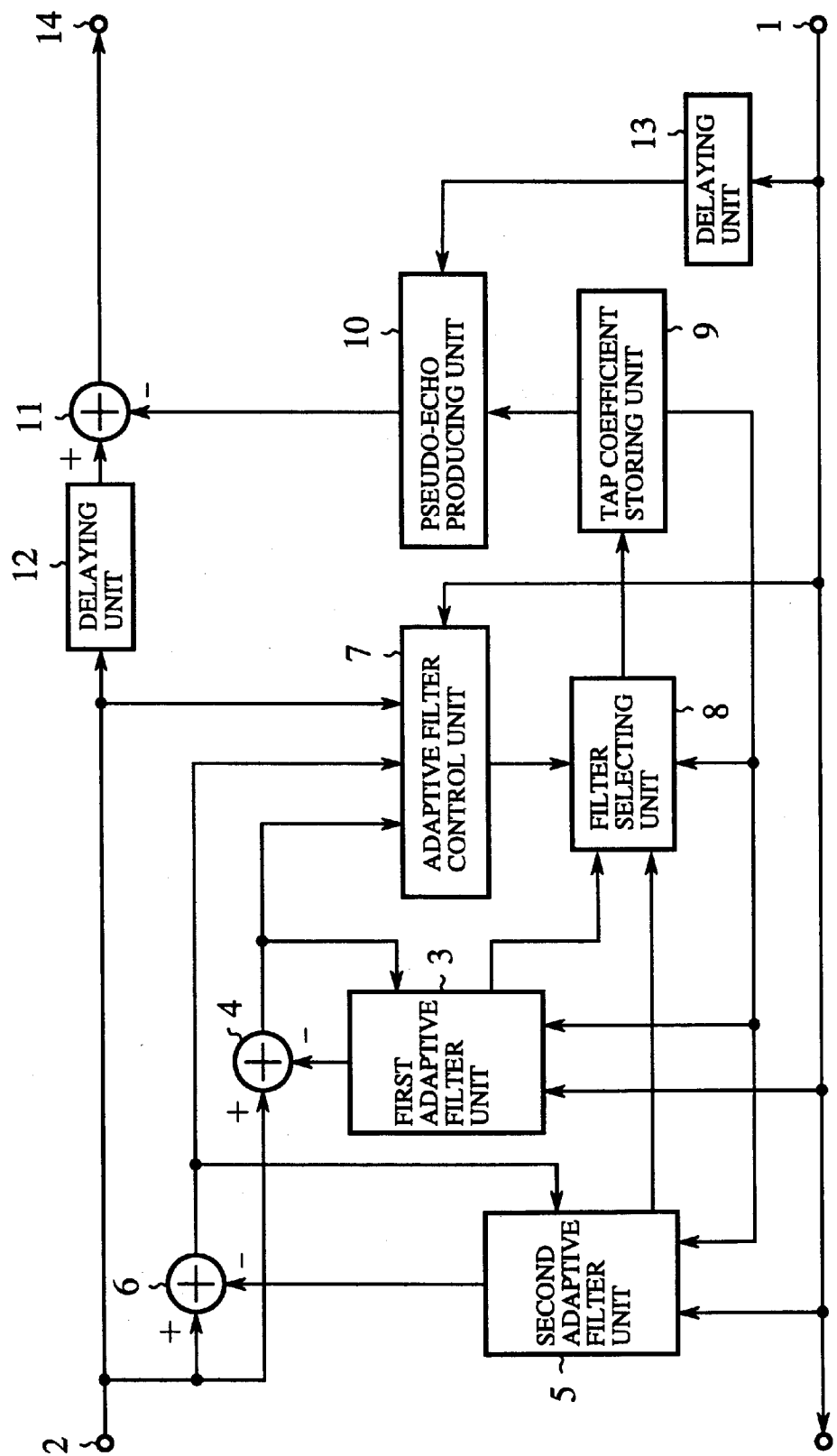
FIG. 10 is a block diagram showing the configuration of a conventional echo canceling apparatus.

Therefore, there is no probability that deteriorating second tap coefficients is selected as the group of first tap coefficients in the before-initial estimate mode. Accordingly, because there is no probability that deteriorating second tap coefficients is selected as the group of first tap coefficients to produce the first pseudo-echo signal in the same manner as in the conventional echo canceling apparatus shown in FIG. 10, a probability that the echo component is amplified can be avoided. After the group of first tap coefficients is replaced with the group of second tap coefficients, the before-initial estimate mode is changed to the after-initial estimate mode.

After the initial estimate, in cases where no echo path change occurs, it can be correctly judged in the first adaptive filter renewal control unit 107 whether the echo canceling apparatus is in the double talk state or the state of the only existence of the echo component, there is no probability that the renewal of the group of first tap coefficients performed in the first adaptive filter unit 103 is stopped in the state of the only existence of the echo component, so that the renewal of the group of first tap coefficients is appropriately performed.

However, in cases where the echo canceling apparatus is used for a telephone arranged in a motor car to perform a hand-free communication with the far-end caller, an echo path between a speaker denoting the output terminal 101 of the reception signal and a microphone denoting the input terminal 102 of the transmission signal changes with time according to the motion of a person placed in the motor car or conditions of open/closed windows of the motor car. Therefore, to cancel the echo component of the transmission signal, it is required to estimate the group of first tap coefficients and the group of second tap coefficients according to the change of the echo path.

In case of the change of the echo path, the group of first tap coefficients and the group of second tap coefficients, of which the estimate before the change of the echo path is completed at a current time, considerably differ from the group of first tap coefficients and the group of second tap coefficients to be estimated after the change of the echo path. Therefore, the first pseudo-echo signal produced from the group of first tap coefficients estimated before the change of the echo path in the first adaptive filter unit 103 considerably differ from the echo signal denoting the echo component of the transmission signal obtained after the change of the echo path, so that the echo component of the transmission signal cannot be sufficiently canceled. In this case, the equation (8) is satisfied even in the state of the only existence of the echo component, and there is a probability that the first adaptive filter renewal control unit 107 judges to be a first tap coefficient renewal stop time-period. Therefore, to appropriately cancel the echo-component of the transmission signal by replacing the group of first tap coefficients not renewed with the appropriately estimated second tap coefficients as soon as possible, in cases where all the equations (9), (11) and (12) are satisfied, the adaptive filter selecting unit 109 determines to replace the group of first tap coefficients with the group of second tap coefficients.

That is, in cases where the equations (9) and (11) are satisfied, because a ratio of the average power level En1(i) of the first error signal to the average power level Sn(i) of the transmission signal is lower than a value of 1/p6, the adaptive filter selecting unit 109 detects that the transmission signal of the current time includes only the echo component. Also, in cases where the equation (12) is satisfied, because a ratio of the average power level En1(i) of the first error signal to the average power level En2(i) of the second error signal is higher than the value of the constant p7, the adaptive filter selecting unit 109 judges that the group of first tap coefficients not renewed any more are estimated before the change of the echo path to make the estimate of the group of first tap coefficients insufficient and that the group of second tap coefficients is estimated after the change of the echo path to make the estimate of the group of second tap coefficients sufficient.

Accordingly, even though the echo path changes so as to stop the renewal of the group of first tap coefficients, because the group of first tap coefficients not renewed any more is replaced with the group of second tap coefficients sufficiently estimated, the first pseudo-echo signal is produced from the group of second tap coefficients sufficiently estimated, so that the echo component of the transmission signal can be reliably canceled.

However, in cases where the echo canceling apparatus is set in the double talk state, because the renewal of the group of first tap coefficients of the first adaptive filter unit 103 is stopped according to the equation (8) under the control of the first adaptive filter renewal control unit 107, the group of first tap coefficients does not deteriorate. Also, because all the equations (9), (11) and (12) are not satisfied, the adaptive filter selecting unit 109 determines not to replace the group of first tap coefficients with the group of second tap coefficients. Therefore, though the group of first tap coefficients is selected in the filter selecting unit 8 of the conventional echo canceling apparatus shown in FIG. 10 on condition that the equation (5) is satisfied according to the second selection condition, because the selection of the group of first tap coefficients, which corresponds to that performed in the conventional echo canceling apparatus on condition that the average power level of the first error signal output from the first subtracting unit 104 is lower than the average power level of the second error signal output from the second subtracting unit 106 (the equation (5)), is not adopted in the first embodiment, there is no probability that the group of first tap coefficients not deteriorating is erroneously replaced with the group of second tap coefficients deteriorating in the double talk state to produce the first pseudo-echo signal from the deteriorating second tap coefficients, and there is no probability that the echo component of the transmission signal is amplified.

Also, there is a case where the echo path is cut to immediately set contents of the echo path to an open state. This case is called an infinite return loss. In this case, the echo path considerably changes. To stably cancel the echo component even though the infinite return loss occurs, in cases where no-satisfaction of the equation (11) is successively detected P times on condition that the equations (9) and (10) are satisfied, the occurrence of an infinite return loss is judged in the adaptive filter selecting unit 109, and the replacement of the group of first tap coefficients with the group of second tap coefficients is determined in the adaptive filter selecting unit 109. In cases where the equations (9) and (10) are satisfied, a sufficient estimate of the group of second tap coefficients can be detected in the adaptive filter selecting unit 109 at a certain possibility. However, because the equation (11) is not satisfied, a ratio of the average power level $En1(i)$ of the first error signal to the average power level $Sn(i)$ of the transmission signal is not lower than a value of $1/p6$, so that the adaptive filter selecting unit 109 cannot detect that only the echo component is included in the transmission signal. Therefore, even though the equations (9) and (10) are satisfied, a sufficient estimate of the group of second tap coefficients is not concluded in the adaptive filter selecting unit 109. However, in cases where no-satisfaction of the equation (11) is successively detected P times on condition that the equations (9) and (10) are satisfied, it is judged in the adaptive filter selecting unit 109 that the group of second tap coefficients is sufficiently estimated, and it is judged in the adaptive filter selecting unit 109 that the degree of estimate precision of the group of first tap coefficients is considerably degraded because of the occurrence of an infinite return loss.

As is described above, the occurrence of an infinite return loss can be detected in the adaptive filter selecting unit 109 in cases where no-satisfaction of the equation (11) is successively detected P times on condition that the equations (9) and (10) are satisfied. Therefore, even though an infinite return loss occurs, the echo component of the transmission signal can be canceled by replacing the group of first tap coefficients with the group of second tap coefficients. Also, in cases where the equation (8) is not satisfied when an infinite return loss occurs, the renewal of the group of first tap coefficients in the first adaptive filter unit 103 is not stopped by the first adaptive filter renewal control unit 107.

However, in cases where the echo canceling apparatus is set in the double talk state when an infinite return loss occurs, because the equation (8) is satisfied on condition that the equation (7) is not satisfied, the renewal of the group of first tap coefficients in the first adaptive filter unit 103 is stopped under control of the first adaptive filter renewal control unit 107, so that the group of first tap coefficients does not deteriorate. In contrast, though the renewal of the group of second tap coefficients is continued under control of the second adaptive filter renewal control unit 108 to make the group of second tap coefficients deteriorate, because there is no probability that the no-satisfaction of the equation (11) is successively detected P times, it is determined in the adaptive filter selecting unit 109 that the group of first tap coefficients is not replaced with the group of second tap coefficients. Therefore, the selection of the group of first tap coefficients in the first embodiment differs from that in the conventional echo canceling apparatus shown in FIG. 10 in which the group of first tap coefficients is selected on condition that the average power level E1 of the first error signal output from the first subtracting unit 104 is lower than the average power level E2 of the second error signal output from the second subtracting unit 106, there is no probability that the group of first tap coefficients not deteriorating is erroneously replaced with the group of second tap coefficients deteriorating in the double talk state to produce the first pseudo-echo signal from the deteriorating second tap coefficients, and there is no probability that the echo component of the transmission signal is amplified.

Figure 2:
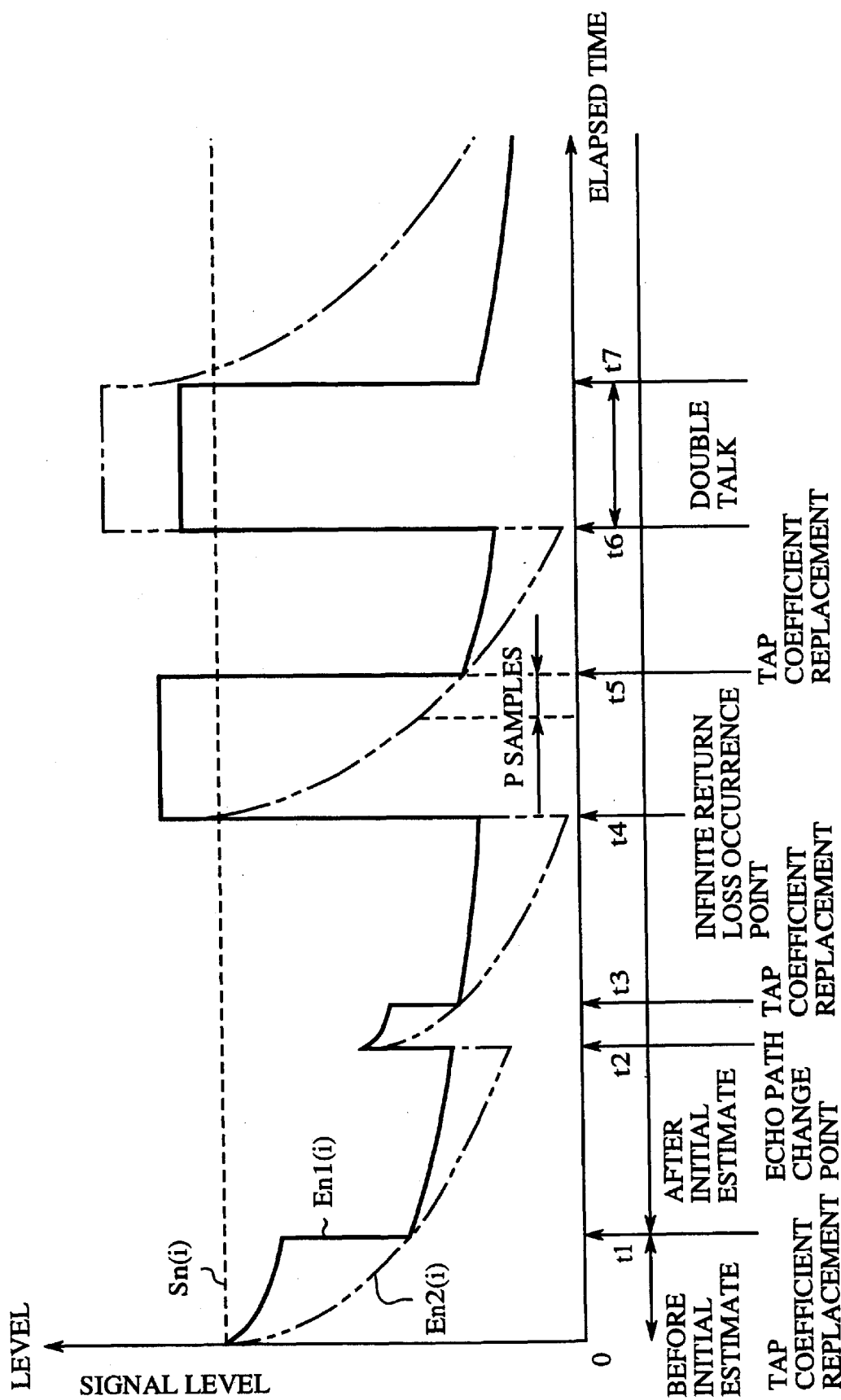
FIG. 2 is an explanatory diagram showing a timing of the selection of a group of first tap coefficients or a group of second tap coefficients according to the first embodiment.

FIG. 2 is an explanatory diagram showing a timing of the selection of the group of first tap coefficients or the group of second tap coefficients according to the first embodiment. In FIG. 2, the Y-axis indicates levels (average power levels) of the transmission signal, the first error signal and the second error signal, and the X-axis indicates an elapsed time. Also, a solid line indicates the average power level $En1(i)$ of the first error signal, a two-dot-chain-line indicates the average power level $En2(i)$ of the second error signal, and a dotted line indicates the average power level $Sn(i)$ of the transmission signal. The transmission signal includes only the echo component in a time-period from a time 0 to a time t6.

As shown in FIG. 2, when the operation of the echo canceling apparatus is started at the time 0, the group of first tap coefficients is gradually estimated in the before-initial estimate mode, the group of second tap coefficients is rapidly estimated in the before-initial estimate mode, and the group of first tap coefficients is replaced with the group of second tap coefficients at a time t1 in the before-initial estimate mode. After the replacement, the before-initial estimate mode is changed to the after-initial estimate mode. The echo path changes at a time t2, and the group of first tap coefficients is replaced with the group of second tap coefficients at a time t3 in the after-initial estimate mode. An infinite return loss occurs at a time t4, the infinite return loss is detected in the adaptive filter selecting unit 109 at a time t5, and the group of first tap coefficients is immediately replaced with the group of second tap coefficients at the time t5 in the after-initial estimate mode. The echo canceling apparatus is set in the double talk state in a time-period from the time t6 to a time t7. In this time-period, because the second adaptive filter unit 105 is controlled by the second adaptive filter renewal control unit 108 according to the equation (7), the degree of estimate precision of the group of second tap coefficients is considerably degraded, so that the average power level $En2(i)$ of the second error signal exceeds the average power level $Sn(i)$ of the transmission signal. However, because the first adaptive filter unit 103 is controlled by the first adaptive filter renewal control unit 107 according to the equations (7) and (8) and because the constant p5 is set to a high value, the renewal of the group of first tap coefficients is stopped under control of the first adaptive filter renewal control unit 107, so that the degree of estimate precision of the group of first tap coefficients is hardly degraded. Because it is not judged in the adaptive filter selecting unit 109 in the double talk state that the group of first tap coefficients is replaced with the group of second tap coefficients, there is no probability that the echo is amplified in the double talk state of the time-period from the time t6 to the time t7, so that there is no probability that the average power level En1(i) of the first error signal output as the echo canceled output signal considerably exceeds the average power level Sn(i) of the transmission signal.

After the time 7, the transmission signal includes only the echo component. Because the degree of estimate precision of the group of first tap coefficients is hardly degraded in the double talk state, the degree of estimate precision of the group of first tap coefficients in a time-period after the time t7 is almost the same as that at a time just before the time t6. Therefore, the echo canceled output signal can be output after the time t7 on condition that the average power level of the echo canceled output signal is almost the same as the average power level En1(i) of the first error signal at a time just before the time t6.

Figure 3:
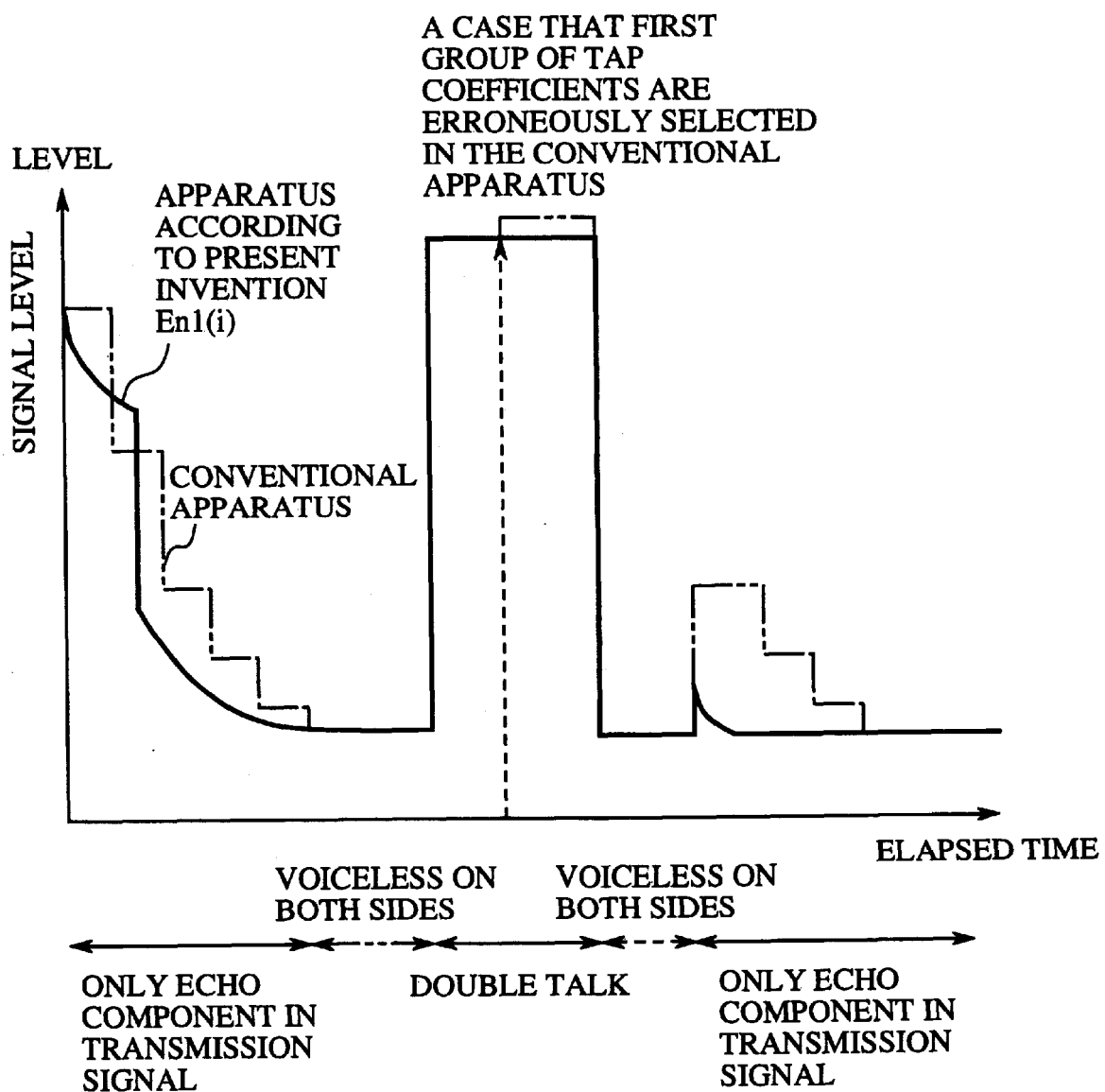
FIG. 3 is an explanatory diagram showing a performance comparison between a conventional echo canceling apparatus and the echo canceling apparatus of the first embodiment.

FIG. 3 is an explanatory diagram showing a performance comparison between the conventional echo canceling apparatus and the echo canceling apparatus of the first embodiment. In FIG. 3, the Y-axis indicates a level (average power level) of the echo canceled output signal, and the X-axis indicates an elapsed time. A solid line indicates the level of the echo canceled output signal according to the first embodiment, and a two-dot-chain-line indicates the level of the echo canceled output signal obtained in the conventional echo canceling apparatus.

In the conventional echo canceling apparatus, because an appropriate group of tap coefficients is selected from three groups of tap coefficients for each tap coefficient selection cycle corresponding to M sample cycles, the level of the echo canceled output signal is reduced stepwise. Also, the echo canceled output signal is delayed by a delay time corresponding to M samples in the delaying unit 12.

In contrast, in the echo canceling apparatus of the first embodiment, because the group of first tap coefficients or the group of second tap coefficients is selected in the adaptive filter selecting unit 109 for each sample, so that the tap coefficient selection cycle corresponding to M sample cycles is not required in the first embodiment. Also, because no delaying unit is arranged in the echo canceling apparatus, the level of the echo canceled output signal can be rapidly reduced as compared with that of the conventional echo canceling apparatus. Also, because the renewal of the group of first tap coefficients is stopped in the double talk state though the renewal of the group of second tap coefficients is continued in the double talk state, a probability of the deterioration of selected tap coefficients used for the production of the echo canceled output signal can be suppressed in the double talk state by selecting the group of first tap coefficients in the adaptive filter selecting unit 109 as the selected tap coefficients. Also, when the transmission signal includes only the echo component after the double talk state, because the group of first tap coefficients does not deteriorate in the double talk state, the level increase of the echo canceled output signal can be suppressed.

Also, because the equation (4) used in the adaptive filter renewal control method of the conventional echo canceling apparatus is not used in the echo canceling apparatus of the first embodiment, though the conventional echo canceling apparatus is available only for a specific echo path environment corresponding to the value of the constant p2, the echo canceling apparatus not depending on the echo path environment can be obtained in the first embodiment.

Also, because only two types of tap coefficients are used and because no delaying unit is used, the configuration of the echo canceling apparatus according to the first embodiment can be simplified.

Accordingly, in the first embodiment, because the group of first tap coefficients used for the production of the first pseudo-echo signal in the first adaptive filter unit 103 is replaced with the group of second tap coefficients used for the production of the second pseudo-echo signal in the second adaptive filter unit 105 under control of the adaptive filter selecting unit 109 according to a level relationship among the transmission signal, the reception signal, the first error signal produced in the first subtracting unit 104 according to the first pseudo-echo signal and the second error signal produced in the second subtracting unit 106 according to the second pseudo-echo signal, even though the double talk state is erroneously detected in the first adaptive filter renewal control unit 107 in an echo path change or an infinite return loss to stop the renewal of the group of first tap coefficients, because the group of first tap coefficients is replaced with the group of second tap coefficients of which the renewal is continued in the echo path change or the infinite return loss, the echo canceled output signal equivalent to the transmission signal, in which the echo component is canceled according to the highly estimated tap coefficients selected in the adaptive filter selecting unit 109, can be always obtained regardless of the echo path change or the infinite return loss without stopping the renewal of the group of tap coefficients corresponding to the production of the echo canceled output signal. Also, the echo canceling apparatus not depending on the echo path environment can be manufactured in a small size without amplifying the echo included in the transmission signal. Also, the echo canceling apparatus, in which the echo canceled output signal is output without any delaying time, can be obtained.

Embodiment 2

In the first embodiment, the tap coefficient renewal algorithm (for example, the LMS algorithm) used in the first adaptive filter unit 103 is the same as that used in the second adaptive filter unit 105. However, in a second embodiment, the tap coefficient renewal algorithm used in a first adaptive filter unit differs from that used in a second adaptive filter unit.

Figure 4:
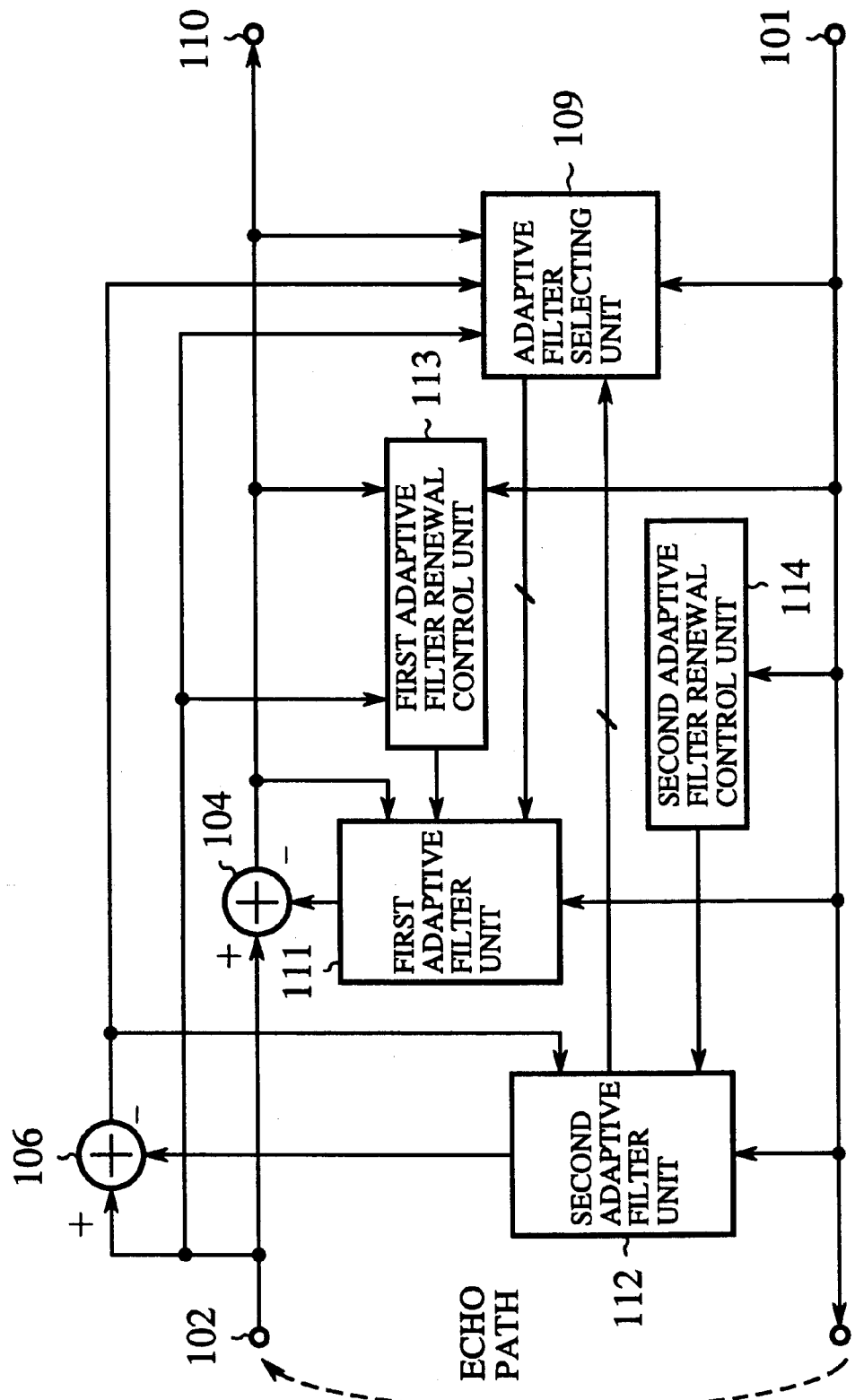
FIG. 4 is a block diagram showing the configuration of an echo canceling apparatus according to a second embodiment of the present invention.

FIG. 4 is a block diagram showing the configuration of an echo canceling apparatus according to a second embodiment of the present invention. In FIG. 4, 101 indicates the reception signal terminal at which the reception signal is received. 102 indicates the transmission signal terminal at which the transmission signal is received. 104 indicates a first subtracting unit, 106 indicates a second subtracting unit, 109 indicates the adaptive filter selecting unit, and 110 indicates the output signal terminal from which the echo canceled output signal is output. Also, in the same manner as in the first embodiment, the reception signal denotes a far-end caller's voice transmitted to the near-end caller through the transmission path, and the transmission signal denotes a near-end caller's voice and/or an echo signal occurring when the reception signal received at the reception signal terminal 101 passes through an echo path of the near-end caller.

Also, 111 indicates a first adaptive filter unit functioning in the same manner as the first adaptive filter unit 103. 112 indicates a second adaptive filter unit functioning in the same manner as the second adaptive filter unit 105. A tap coefficient renewal algorithm used in the first adaptive filter unit 111 differs from that used in the second adaptive filter unit 112.

113 indicates a first adaptive filter renewal control unit, corresponding to the first adaptive filter renewal control unit 107, for judging whether or not the renewal of the group of first tap coefficients of the first adaptive filter unit 111 is to be performed. 114 indicates a second adaptive filter renewal control unit, functioning in the same manner as the second adaptive filter renewal control unit 108, for judging whether or not the renewal of the group of second tap coefficients of the second adaptive filter unit 112 is to be performed. A tap coefficient renewal judging method used in the first adaptive filter renewal control unit 113 is the same as that used in the second adaptive filter renewal control unit 114. The tap coefficient renewal judging method is, for example, the same as that performed according to the Renewal Condition 1 in the second adaptive filter renewal control unit 108.

The other units, which are indicated by the same reference symbols as those of the units shown in FIG. 1, are the same as the units shown in FIG. 1.

Next, an operation of the echo canceled apparatus of the second embodiment is described.

The tap coefficient renewal algorism used in the first adaptive filter unit 111 and the tap coefficient renewal algorism used in the second adaptive filter unit 112 are respectively selected from the LMS algorithm, a high frequency emphasizing type LMS algorithm, an affine algorithm and the Karman algorithm having tap coefficient convergence speeds different from each other. In this embodiment, the tap coefficient renewal algorism used in the first adaptive filter unit 111 has a tap coefficient convergence speed lower than that of the tap coefficient renewal algorism used in the second adaptive filter unit 112.

Also, the renewal of the group of first tap coefficients performed in the first adaptive filter unit 111 is controlled by the first adaptive filter renewal control unit 113 according to the tap coefficient renewal judging method, and the renewal of the group of second tap coefficients performed in the second adaptive filter unit 112 is controlled by the second adaptive filter renewal control unit 114 according to the same tap coefficient renewal judging method as that used in the first adaptive filter renewal control unit 113.

Because the tap coefficient renewal algorism used in the first adaptive filter unit 111 has a tap coefficient convergence speed lower than that of the tap coefficient renewal algorism used in the second adaptive filter unit 112, even though the group of first tap coefficients and the group of second tap coefficients are renewed in the double talk state to make the group of first tap coefficients and the group of second tap coefficients deteriorate, a deterioration degree of the group of first tap coefficients is lower than that of the group of second tap coefficients. Therefore, the deterioration degree of tap coefficients used for the production of the echo canceled output signal can be made low by selecting the group of first tap coefficients as those used for the production of the echo canceled output signal in the adaptive filter selecting unit 109. That is, the deterioration of the group of first tap coefficients in the first adaptive filter unit 111 can be made small in the same manner as in the first adaptive filter unit 107 in which the deterioration of the group of first tap coefficients is prevented.

Accordingly, because the first pseudo-echo signal output from the first adaptive filter unit 111 is produced by performing the convolution calculation using the group of first tap coefficients stably converged and the reception signal, the first error signal output from the first subtracting unit 104 is always stable, and the stable echo canceled output signal can be output without amplifying the echo component.

Also, because the tap coefficient renewal algorism used in the second adaptive filter unit 112 has a tap coefficient convergence speed higher than that of the tap coefficient renewal algorism used in the first adaptive filter unit 111, though there is a possibility that the group of second tap coefficients deteriorates in the double talk state, the group of second tap coefficients can be rapidly converged in the second adaptive filter unit 112 as compared with the group of first tap coefficients estimated in the first adaptive filter unit 111. Therefore, even though an echo path change or an infinite return loss occurs, because the group of second tap coefficients can be rapidly converged in the same manner as those in the second adaptive filter unit 105, and the stable echo canceled output signal, in which the echo is canceled, can be always output regardless of the occurrence of the echo path change or the infinite return loss.

In this embodiment, the tap coefficient renewal judging method used in the first adaptive filter renewal control unit 113 is the same as that used in the second adaptive filter renewal control unit 114. However, in the same manner as in the first embodiment, it is applicable that the tap coefficient renewal judging method used in the first adaptive filter renewal control unit 113 differ from that used in the second adaptive filter renewal control unit 114 to renew the group of first tap coefficients and the group of second tap coefficients in the tap coefficient renewal judging methods different from each other.

Also, in this embodiment, the tap coefficient renewal judging method used in the first and second adaptive filter renewal control units 113 and 114 is the same as that performed according to the Renewal Condition 1 in the second adaptive filter renewal control unit 108. However, it is applicable that the tap coefficient renewal judging method used in the first and second adaptive filter renewal control units 113 and 114 be the same as that performed according to the Renewal Condition 1 and the Renewal Condition 2 in the first adaptive filter renewal control unit 107.

Accordingly, because the tap coefficient renewal algorism having a low tap coefficient convergence speed is used for the first adaptive filter unit 111 and because the tap coefficient renewal algorism having a high tap coefficient convergence speed is used for the second adaptive filter unit 112, the more stable echo canceled output signal equivalent to the transmission signal, in which the echo component is canceled, can be always obtained regardless of the echo path change or the infinite return loss. Also, the echo canceling apparatus not depending on the echo path environment can be manufactured in a small size without amplifying the echo included in the transmission signal. Also, the echo canceling apparatus, in which the echo canceled output signal is output without any delaying time, can be obtained.

Embodiment 3

In the first and second embodiments, the group of first tap coefficients is replaced with the group of second tap coefficients in the adaptive filter selecting unit 109 according to a level relationship among the reception signal, the transmission signal, the first error signal and the second error signal. However, in a third embodiment, not only the replacement of the group of first tap coefficients with the group of second tap coefficients is performed in an adaptive filter selecting unit, but also the replacement of the group of second tap coefficients with the group of first tap coefficients is performed in the adaptive filter selecting unit.

Figure 5:
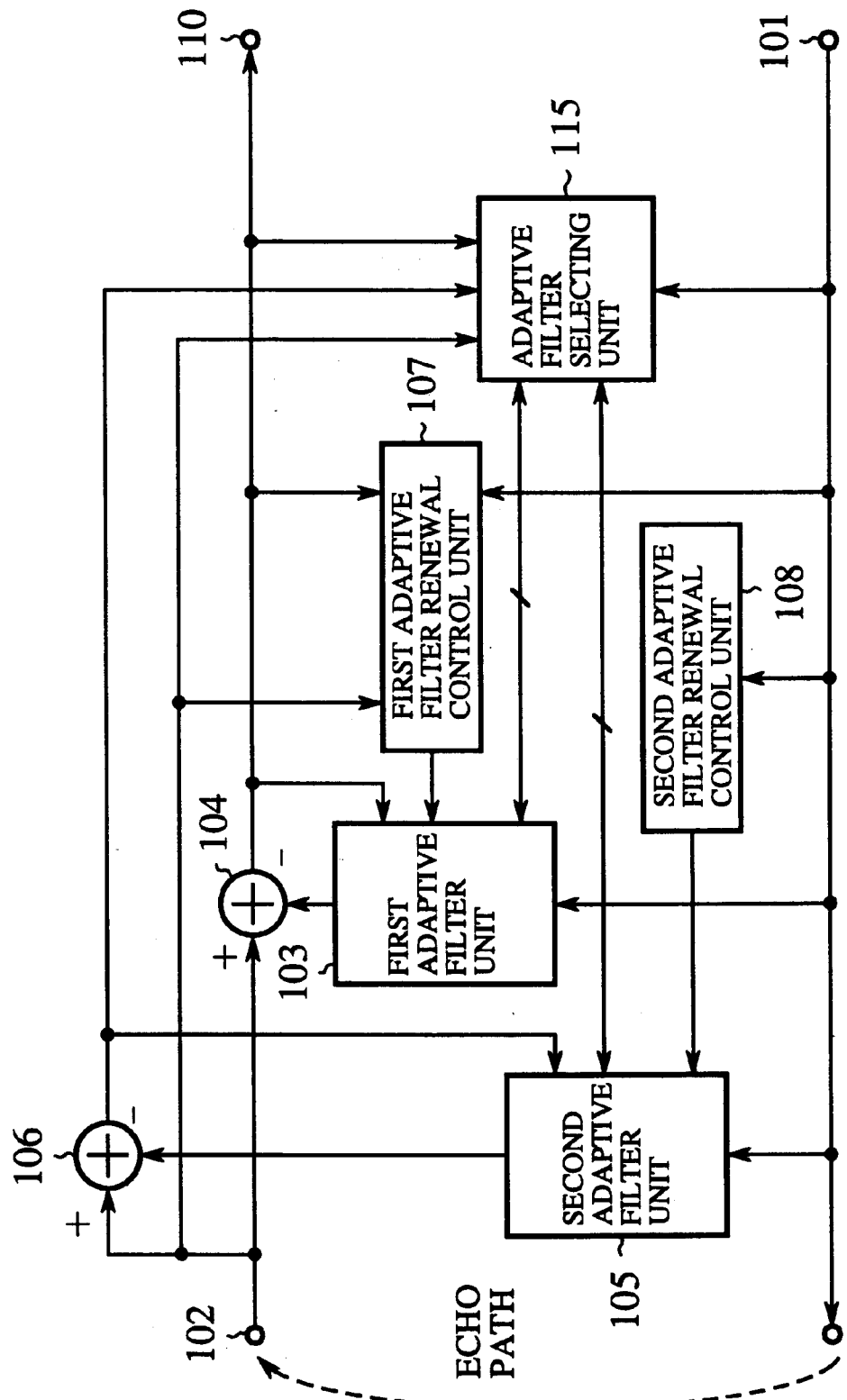
FIG. 5 is a block diagram showing the configuration of an echo canceling apparatus according to a third embodiment of the present invention.

FIG. 5 is a block diagram showing the configuration of an echo canceling apparatus according to a third embodiment of the present invention. In FIG. 5, 101 indicates the reception signal terminal at which the reception signal is received. 102 indicates the transmission signal terminal at which the transmission signal is received. 103 indicates the first adaptive filter unit, 104 indicates the first subtracting unit, 105 indicates the second adaptive filter unit, 106 indicates the second subtracting unit, 107 indicates the first adaptive filter renewal control unit, 108 indicates the second adaptive filter renewal control unit, and 110 indicates the output signal terminal from which the echo canceled output signal is output. Also, in the same manner as in the first embodiment, the reception signal denotes a far-end caller's voice transmitted to the near-end caller through the transmission path, and the transmission signal denotes a near-end caller's voice and/or an echo signal occurring when the reception signal received at the reception signal terminal 101 passes through an echo path of the near-end caller.

Also, 115 indicates an adaptive filter selecting unit, equivalent to the adaptive filter selecting unit 109, for receiving the reception signal, the transmission signal, the first error signal output from the first subtracting unit 104, the second error signal output from the second subtracting unit 106, the group of second tap coefficients of the second adaptive filter unit 105 and the group of first tap coefficients of the first adaptive filter unit 103, judging according to a relationship of average power levels of the reception signal, the transmission signal, the first error signal and the second error signal whether the replacement of the group of first tap coefficients with the group of second tap coefficients or the replacement of the group of second tap coefficients with the group of first tap coefficients is to be performed, and outputting the group of second tap coefficients to the first adaptive filter unit 103 to replace the group of first tap coefficients with the group of second tap coefficients in cases where it is judged that the replacement of the group of first tap coefficients with the group of second tap coefficients is to be performed, and outputting the group of first tap coefficients to the second adaptive filter unit 105 to replace the group of second tap coefficients with the group of first tap coefficients in cases where it is judged that the replacement of the group of second tap coefficients with the group of first tap coefficients is to be performed.

Next an operation of the echo canceling apparatus of the third embodiment is described.

In the first adaptive filter unit 103, the group of first tap coefficients is renewed according to the reception signal and the first error signal produced in the first subtracting unit 104. In this case, the LMS algorithm is used in the same manner as in the first embodiment, the group of first tap coefficients is renewed according to the LMS algorithm in the first adaptive filter unit 103 to make the group of first tap coefficients approximate to an impulse response of the echo path on the near-end caller side. The renewal of the group of first tap coefficients in the first adaptive filter unit 103 is controlled by the first control signal output from the first adaptive filter renewal control unit 107. Also, the first pseudo-echo signal is produced in the first adaptive filter unit 103 by performing a convolution calculation using the group of first tap coefficients and the reception signal.

In the first subtracting unit 104, the first pseudo-echo signal output from the first adaptive filter unit 103 is subtracted from the transmission signal to produce the first error signal. The first error signal is input to the first adaptive filter unit 103, the first adaptive filter renewal control unit 107 and the adaptive filter selecting unit 115. Also, the first error signal is output as the echo canceled output signal from the output signal terminal 110 to the transmission path.

In the second adaptive filter unit 105, the group of second tap coefficients is renewed according to the reception signal and the second error signal produced in the second subtracting unit 106 by using the LMS algorithm. The renewal of the group of second tap coefficients in the second adaptive filter unit 105 is controlled by the second control signal output from the second adaptive filter renewal control unit 108. Also, the second pseudo-echo signal is produced in the second adaptive filter unit 105 by performing a convolution calculation using the group of second tap coefficients and the reception signal.

In the second subtracting unit 106, the second pseudo-echo signal output from the second adaptive filter unit 105 is subtracted from the transmission signal to produce the second error signal. The second error signal is input to the second adaptive filter unit 105 and the adaptive filter selecting unit 115.

In the first adaptive filter renewal control unit 107, in cases where the Renewal Condition 1 or the Renewal Condition 2 is satisfied, it is judged that the renewal of the group of first tap coefficients in the first adaptive filter unit 103 is to be stopped, and the first control signal indicating the stopping of the renewal of the group of first tap coefficients is sent to the first adaptive filter unit 103.

In the second adaptive filter renewal control unit 108, in cases where the Renewal Condition 1 is satisfied, it is judged that the renewal of the group of second tap coefficients in the second adaptive filter unit 104 is to be stopped, and the second control signal indicating the stopping of the renewal of the group of second tap coefficients is sent to the second adaptive filter unit 104.

In the adaptive filter selecting unit 115, an estimate precision of the group of first tap coefficients is compared with an estimate precision of the group of second tap coefficients according to the reception signal, the transmission signal, the first error signal output from the first subtracting unit 104 and the second error signal output from the second subtracting unit 106. As a comparison result, in cases where it is judged that the degree of estimate precision of the group of second tap coefficients is higher than that of the group of first tap coefficients, the group of second tap coefficients received from the second adaptive filter unit 105 is output to the first adaptive filter unit 103, and the group of first tap coefficients is replaced with the group of second tap coefficients in the first adaptive filter unit 103 to produce the first pseudo-echo signal according to the group of second tap coefficients. In contrast, in cases where it is judged that the degree of estimate precision of the group of first tap coefficients is higher than that of the group of second tap coefficients, the group of first tap coefficients received from the first adaptive filter unit 103 are output to the second adaptive filter unit 105, and the group of second tap coefficients is replaced with the group of first tap coefficients in the second adaptive filter unit 105 to produce the second pseudo-echo signal according to the group of first tap coefficients.

The operations of the first adaptive filter renewal control unit 107, the second adaptive filter renewal control unit 108 and the adaptive filter selecting unit 115 are described in detail.

In the second adaptive filter renewal control unit 108, it is judged according to only the equation (7) whether or not the renewal of the group of second tap coefficients is to be performed. Therefore, not only the group of second tap coefficients is renewed in the state in which only the echo component is included in the transmission signal, but also there is a probability, that the group of second tap coefficients is renewed in the double talk state. Therefore, because the group of second tap coefficients deteriorates in the double talk state, even though the double talk state changes to the only echo component state in the echo canceling apparatus, the convergence of the group of second tap coefficients is delayed to a slight degree.

To solve this problem, in cases where it is judged that a deterioration degree of the group of second tap coefficients is higher than that of the group of first tap coefficients in the double talk state, the deterioration of the group of second tap coefficients can be prevented by replacing the group of second tap coefficients with the group of first tap coefficients. Therefore, in cases where the group of second tap coefficients is replaced with the group of first tap coefficients in the double talk state, because the convergence speed of the group of second tap coefficients in the second adaptive filter unit 105 is improved in the only echo component state following the double talk state, the convergence delay of the group of second tap coefficients can be reduced.

In this embodiment, in cases where the equation (9) is satisfied, it is judged that the echo exists in the transmission signal. In cases where the equation (10) is not satisfied, it is judged that the group of second tap coefficients deteriorates. In cases where the equation (11) is satisfied, it is judged that the group of first tap coefficients does not deteriorate. Therefore, in cases where the satisfaction of the equations (9) and (11) and no-satisfaction of the equation (10) are detected, the group of first tap coefficients is output to the second adaptive filter unit 105, and the group of second tap coefficients is replaced with the group of first tap coefficients in the second adaptive filter unit 105.

Accordingly, in the third embodiment, because the group of second tap coefficients received from the second adaptive filter unit 105 is input to the first adaptive filter unit 103 under control of the adaptive filter selecting unit 115 in cases where the degree of estimate precision of the group of second tap coefficients is higher than that of the group of first tap coefficients and because the group of first tap coefficients received from the first adaptive filter unit 103 is input to the second adaptive filter unit 105 under control of the adaptive filter selecting unit 115 in cases where the degree of estimate precision of the group of first tap coefficients is higher than that of the group of second tap coefficients, the convergence speed of the group of second tap coefficients in a time-period after the double talk state can be moreover heightened while maintaining the effects obtained in the echo canceling apparatus according to the first and second embodiments.

Embodiment 4

In the first to third embodiments, all the group of first tap coefficients is replaced with all the group of second tap coefficients at a time just after the tap coefficient replacement is judged in the adaptive filter selecting unit 109 or 115. However, in a fourth embodiment, each first tap coefficient is gradually changed to the corresponding second tap coefficient in a transition time-period while setting the first tap coefficient to each of a plurality of interpolated values according to a linear interpolation based on a time transition until the final transition value of the first tap coefficient reaches the value of the corresponding second tap coefficient.

Figure 6:
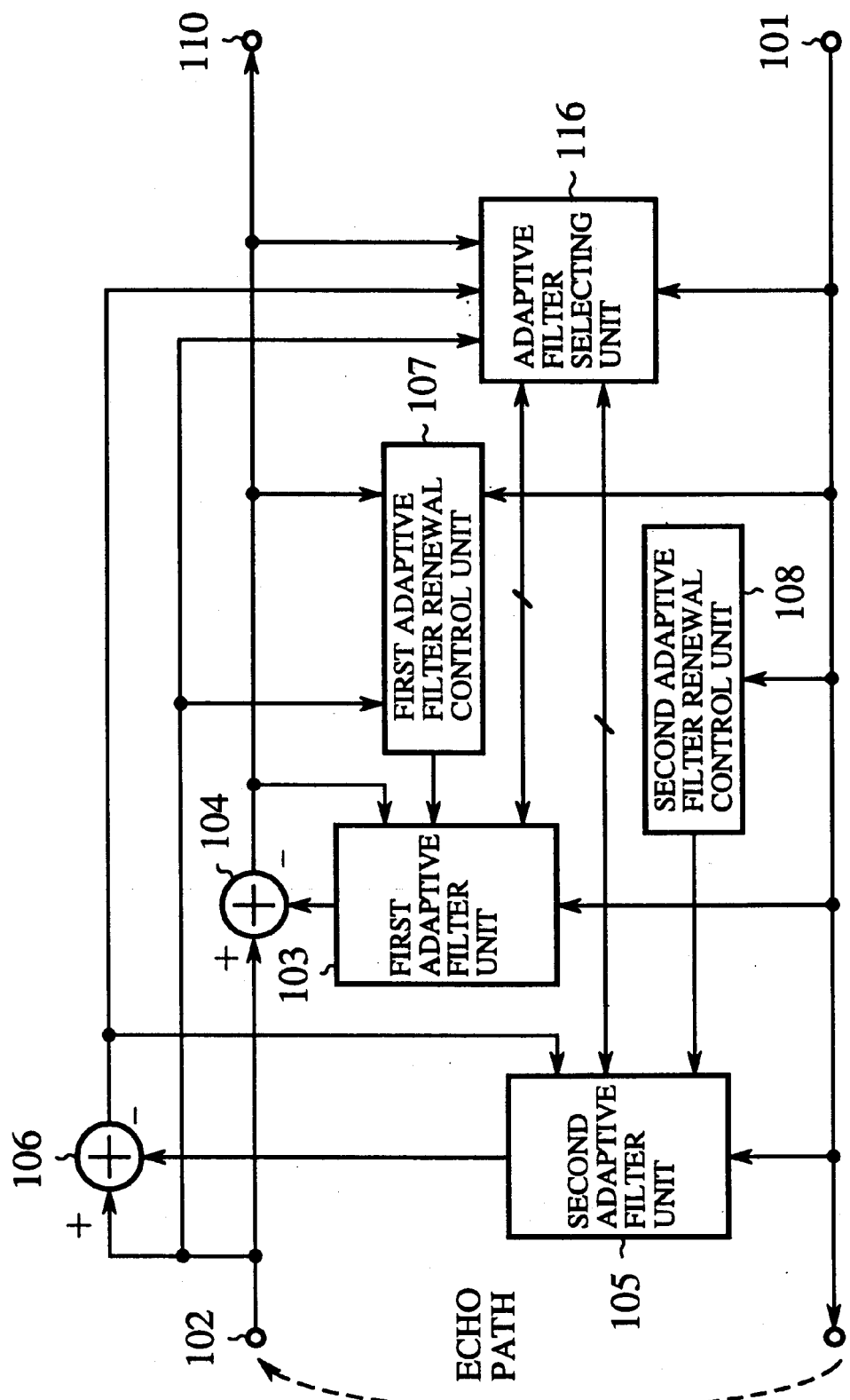
FIG. 6 is a block diagram showing the configuration of an echo canceling apparatus according to a fourth embodiment of the present invention.

FIG. 6 is a block diagram showing the configuration of an echo canceling apparatus according to a fourth embodiment of the present invention. In FIG. 6, 116 indicates an adaptive filter selecting unit equivalent to the adaptive filter selecting units 109 and 115 of the first and third embodiments. A different point of the adaptive filter selecting unit 116 from the adaptive filter selecting units 109 and 115 is that each first (or second) tap coefficient is gradually changed to the corresponding second (or first) tap coefficient in a transition time-period according to a linear interpolation based on a time transition. Also, in the same manner as in the first to third embodiments, the reception signal denotes a far-end caller's voice transmitted to the near-end caller through the transmission path, and the transmission signal denotes a near-end caller's voice and/or an echo signal occurring when the reception signal received at the reception signal terminal 101 passes through an echo path of the near-end caller.

The other units, which are indicated by the same reference symbols as those of the units shown in FIG. 1 and FIG. 5, are the same as the units shown in FIG. 1 and FIG. 5, so that the description of the other units is omitted.

Next an operation of the echo canceling apparatus is described.

In the first to third embodiments, all the first tap coefficients of the group are replaced with all the second tap coefficients of the group at one time just after the tap coefficient replacement is judged in the adaptive filter selecting unit 109 or 115. In this case, because the first pseudo-echo signal produced from the group of first tap coefficients obtained before the replacement has no relationship with the first pseudo-echo signal produced from the group of first tap coefficients obtained after the replacement, a discontinuity point occurs in the first pseudo-echo signal at the replacement time of the group of tap coefficients. Because of the existence of this discontinuity point, a discontinuity point occurs in the first error signal at the replacement time of the group of tap coefficients, and a discontinuity point occurs in the echo canceled output signal at the replacement time of the group of tap coefficients.

To solve the problem of the discontinuity point, in cases where the replacement of the group of first tap coefficients of the first adaptive filter unit 103 with the group of second tap coefficients of the first adaptive filter unit 105 or the replacement of the group of second tap coefficients of the first adaptive filter unit 105 with the group of first tap coefficients of the first adaptive filter unit 103 is performed under the control of the adaptive filter selecting unit 116, each first (or second) tap coefficient is gradually changed to the corresponding second (first) tap coefficient in a transition time-period while setting the first (or second) tap coefficient to each of a plurality of interpolated values according to a linear interpolation based on a time transition until the final transition value of the first (or second) tap coefficient reaches the value of the corresponding second (first) tap coefficient. In this case, the linear interpolation based on the time transition is performed according to an equation (13).

$$A1,t(i)=A2,t(i)+t/MM \times TA(i) \tag{13}$$

Here the symbol t denotes each interpolation time indicated by the number of samples, and $$t=0, N, 2N, 3N, \text{---}, MM$$

is used. The symbol MM denotes the maximum number of samples, and the replacement is completed in the transition time-period corresponding to MM samples. The symbol N denotes the number of samples corresponding to an interpolation time-interval. The symbol A1,t(i) denotes the i-th first tap coefficient set at the interpolation time t corresponding to t samples after the detection of the replacement. The symbol A2,t(i) denotes the i-th second tap coefficient set at the interpolation time t corresponding to t samples after the detection of the replacement.

$$TA(i)=A1,0(i)-A2,0(i)$$

Each first tap coefficient A1,t(i) gradually approaches the corresponding second tap coefficient A2,MM(i)+A1,0(i)−A2,0(i) in the transition time-period corresponding to MM samples by using a difference A1,0(i)−A2,0 (i) between the first tap coefficient and the second tap coefficient at a replacement starting time t=0. Therefore, the discontinuity occurring in the echo canceled output signal in the replacement of the group of tap coefficients can be reduced.

Accordingly, in the fourth embodiment, because the linear interpolation based on the time transition is performed in the adaptive filter selecting unit 116 in cases where the replacement of the first (or second) tap coefficients of the first (or second) adaptive filter unit 103 (or 105) with the second (or first) tap coefficients of the second (or first) adaptive filter unit 105 (or 103) is performed under the control of the adaptive filter selecting unit 116, the echo canceling apparatus, in which the discontinuity occurring in the echo canceled output signal in the replacement of the group of tap coefficients is reduced, can be obtained while maintaining the effects obtained in the echo canceling apparatus according to the first to third embodiments.

Embodiment 5

In the fourth embodiment, the linear interpolation based on the time transition is performed in the replacement of the group of tap coefficients. However, as each tap coefficient is lengthen, a calculation volume required for the linear interpolation is enlarged. Therefore, in a fifth embodiment, to reduce the calculation volume, an echo canceled output signal is produced by adding a first error signal weighted with a first multiplication factor and a second error signal weighted with a second multiplication factor to each other.

Figure 7:
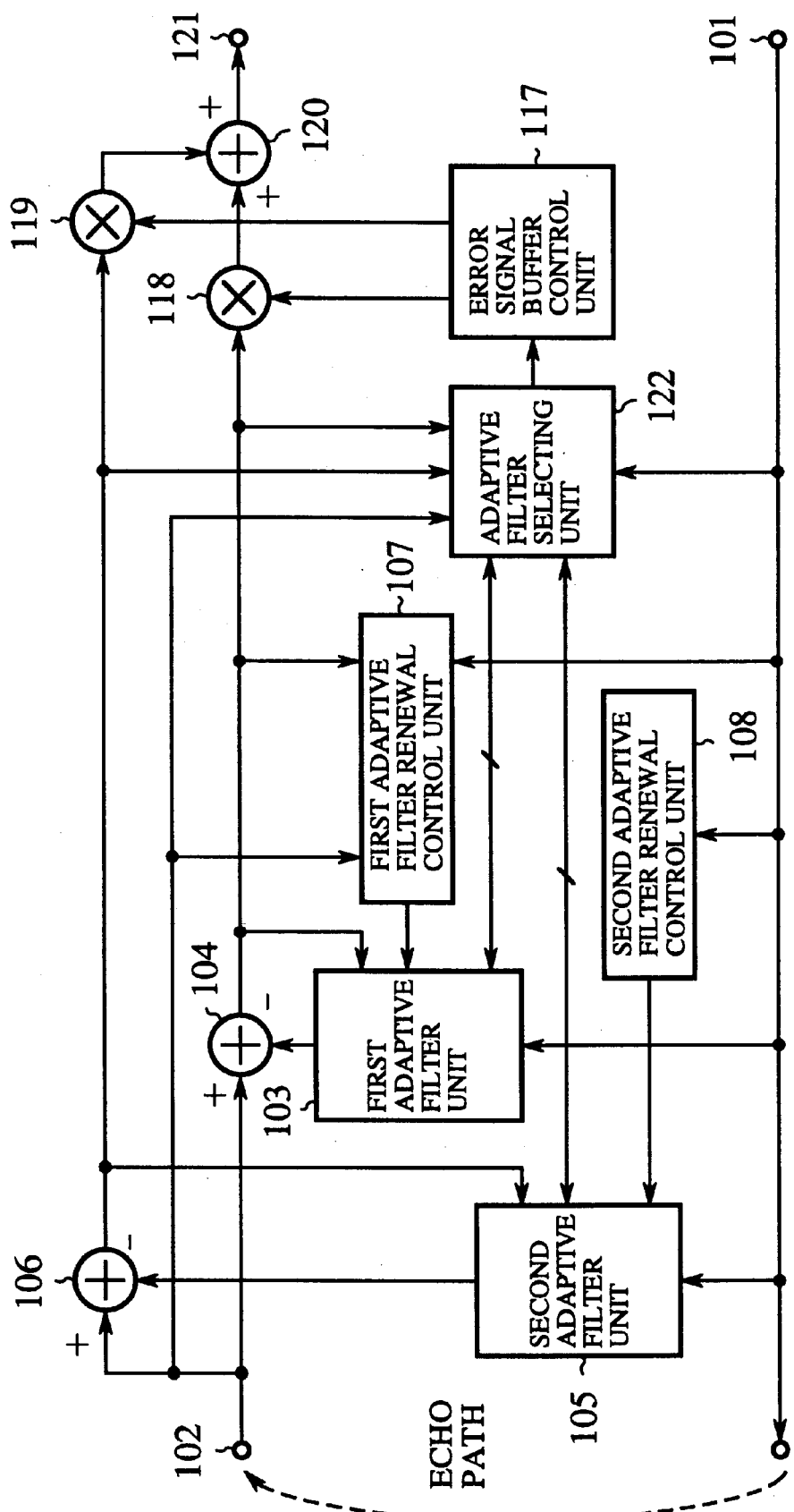
FIG. 7 is a block diagram showing the configuration of an echo canceling apparatus according to a fifth embodiment of the present invention.

FIG. 7 is a block diagram showing the configuration of an echo canceling apparatus according to a fifth embodiment of the present invention. In FIG. 7, 122 indicates an adaptive filter selecting unit equivalent to the adaptive filter selecting unit 115 of the third embodiment. A different point of the adaptive filter selecting unit 122 from the adaptive filter selecting unit 115 is that an adaptive filter selection result indicating the selection of the first adaptive filter unit 103 in case of the replacement of the group of second tap coefficients of the first adaptive filter unit 105 with the group of first tap coefficients of the first adaptive filter unit 103 and indicating the selection of the second adaptive filter unit 105 in case of the replacement of the group of first tap coefficients of the first adaptive filter unit 103 with the group of second tap coefficients of the first adaptive filter unit 105 is produced. 117 indicates an error signal buffer control unit for receiving the adaptive filter selection result from the adaptive filter selecting unit 122, producing a first multiplication factor linearly decreased and a second multiplication factor linearly increased while setting the addition of the first multiplication factor and the second multiplication factor to a value 1 in a transition time-period in cases where the adaptive filter selection result indicates the selection of the second adaptive filter unit 105 and producing a first multiplication factor linearly increased and a second multiplication factor linearly decreased while setting the addition of the first multiplication factor and the second multiplication factor to a value 1 in a transition time-period in cases where the adaptive filter selection result indicates the selection of the first adaptive filter unit 103. 118 indicates a first multiplying unit for receiving the first multiplication factor produced in the error signal buffer control unit 117 and multiplying the first error signal, which is obtained by canceling the echo component of the transmission signal in the first subtracting unit 104, by the first multiplication factor to produce a first multiplied error signal. 119 indicates a second multiplying unit for receiving the second multiplication factor produced in the error signal buffer control unit 117 and multiplying the second error signal, which is obtained by canceling the echo component of the transmission signal in the second subtracting unit 105, by the second multiplication factor to produce a second multiplied error signal. 120 indicates an adding unit for receiving the first multiplied error signal produced in the first multiplying unit 118 and the second multiplied error signal produced in the second multiplying unit 119 and adding the first multiplied error signal and the second multiplied error signal to each other to produce an echo canceled output signal. 121 indicates an output signal terminal from which the echo canceled output signal produced in the adding unit 120 is output. Also, in the same manner as in the first to fourth embodiments, the reception signal denotes a far-end caller's voice transmitted to the near-end caller through the transmission path, and the transmission signal denotes a near-end caller's voice and/or an echo signal occurring when the reception signal received at the reception signal terminal 101 passes through an echo path of the near-end caller.

The other units, which are indicated by the same reference symbols as those of the units shown in FIG. 1, FIG. 5 and FIG. 6, are the same as the units shown in FIG. 1, FIG. 5 and FIG. 6, so that the description of the other units is omitted.

Next, an operation of the echo canceling apparatus according to the fifth embodiment is described.

In the adaptive filter selecting unit 122, an estimate precision of the group of first tap coefficients is compared with an estimate precision of the group of second tap coefficients according to the reception signal, the transmission signal, the first error signal output from the first subtracting unit 104 and the second error signal output from the second subtracting unit 106. As a comparison result, in cases where it is judged that the degree of estimate precision of the group of second tap coefficients is higher than that of the group of first tap coefficients, an adaptive filter selection result indicating the selection of the second adaptive filter unit 105 is produced and output to the error signal buffer control unit 117. Also, the group of second tap coefficients received from the second adaptive filter unit 105 is output to the first adaptive filter unit 103 after a transition time-period corresponding to MM samples passes, and the group of first tap coefficients is replaced with the group of second tap coefficients in the first adaptive filter unit 103 to produce the first pseudo-echo signal according to the group of second tap coefficients after the transition time-period. In contrast, in cases where it is judged that the degree of estimate precision of the group of first tap coefficients is higher than that of the group of second tap coefficients, an adaptive filter selection result indicating the selection of the first adaptive filter unit 103 is produced and output to the error signal buffer control unit 117. Also, the group of first tap coefficients received from the first adaptive filter unit 103 is output to the second adaptive filter unit 105 after a transition time-period corresponding to MM samples passes, and the group of second tap coefficients is replaced with the group of first tap coefficients in the second adaptive filter unit 105 to produce the second pseudo-echo signal according to the group of first tap coefficients after the transition time-period.

In the error signal buffer control unit 117, when the adaptive filter selection result is input, it is detected that the replacement of the group of first tap coefficients of the first adaptive filter unit 103 with the group of second tap coefficients of the first adaptive filter unit 105 or the replacement of the group of second tap coefficients of the first adaptive filter unit 105 with the group of first tap coefficients of the first adaptive filter unit 103 is performed after the transition-period corresponding to MM samples, and a first multiplication factor and a second multiplication factor are produced according to the adaptive filter selection result. The first multiplication factor is output to the first multiplying unit 118, and the second multiplication factor is output to the second multiplying unit 119. In the first multiplying unit 118, the first error signal produced in the first subtracting unit 104 is multiplied by the first multiplication factor to produce a first multiplied error signal, and the first multiplied error signal is output to the adding unit 120. In the second multiplying unit 119, the second error signal produced in the second subtracting unit 106 is multiplied by the second multiplication factor to produce a second multiplied error signal, and the second multiplied error signal is output to the adding unit 120. In the adding unit 120, the first multiplied error signal and the second multiplied error signal are added to each other to produce an echo canceled output signal, and the echo canceled output signal is output from the terminal 121.

The operations of the error signal buffer control unit 117, the first multiplying unit 118, the second multiplying unit 119 and the adding unit 120 are described in detail.

In the tap coefficient replacement performed according to the linear interpolation based on the time transition in the fourth embodiment, because the tap coefficient replacement is repeatedly performed by setting each tap coefficient to the interpolated values, a calculation volume required for the linear interpolation is enlarged as each tap coefficient is lengthen. Therefore, in the fifth embodiment, to reduce the calculation volume required in the tap coefficient replacement, a time-varying first multiplication factor linearly decreased (or increased) in the transitional time period and a time-varying second multiplication factor linearly increased (or decreased) in the transitional time period are produced, and an echo canceled output signal in the transitional time period is produced by adding the first error signal weighted with the time-varying first multiplication factor and the second error signal weighted with the time-varying second multiplication factor to each other.

Figure 8:
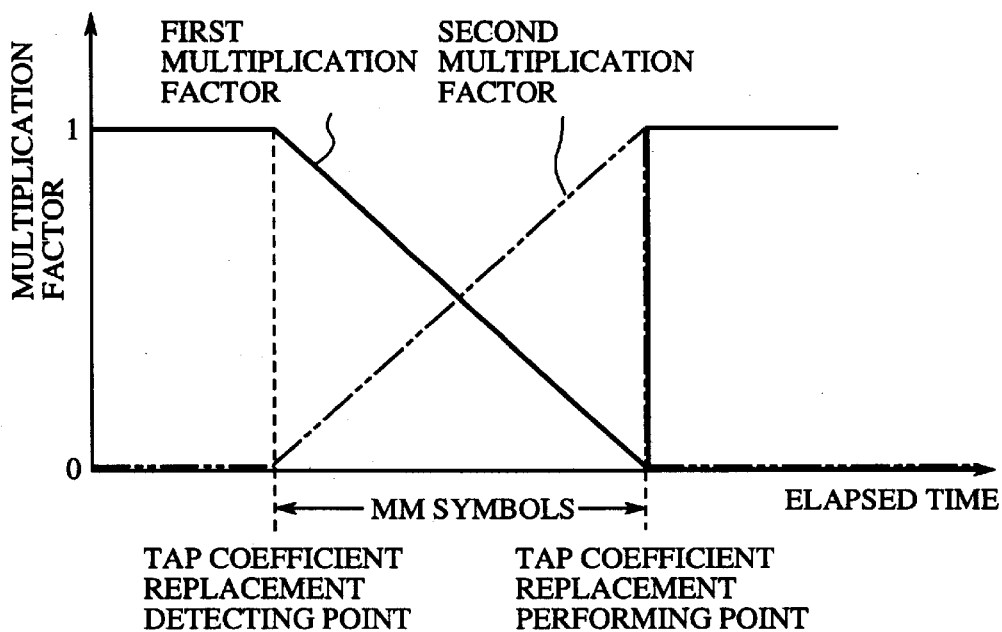
FIG. 8 is an explanatory diagram showing a time change of a first multiplication factor and a time change of a second multiplication factor in case of the replacement of the group of first tap coefficients with the group of second tap coefficients.

FIG. 8 is an explanatory diagram showing a time change of the first multiplication factor and a time change of the second multiplication factor in case of the replacement of the group of first tap coefficients with the group of second tap coefficients. In FIG. 8, the Y-axis indicates values of the first and second multiplication factors, the X-axis indicates an elapsed time, the first multiplication factor is indicated by a solid line, and the second multiplication factor is indicated by a two-dot-chain line.

As shown in FIG. 8, the first multiplication factor is linearly decreased from 1 to 0 in a transition time-period corresponding to MM samples, and the second multiplication factor is linearly increased from 0 to 1 in the transition time-period. Also, the first multiplication factor is set to 1 in a time-period other than the transition time-period, and the second multiplication factor is set to 0 in the time-period other than the transition time-period. After the transition time-period passes, the replacement of the group of tap coefficients is performed.

Because the echo canceled output signal is produced in the transitional time-period by adding the first error signal weighted with the time-varying first multiplication factor and the second error signal weighted with the time-varying second multiplication factor to each other, it is not required to replace the group of first tap coefficients of the first adaptive filter unit 103 with the group of second tap coefficients set to interpolated values in the transition time-period. Also, because the first multiplication factor set to 1 and the second multiplication factor set to 0 are output to the first and second multiplying units 118 and 119 in the time-period other than the transition time-period, the echo canceled output signal is the same as the first error signal output from the first subtracting unit 104 in the time-period other than the transition time-period. Therefore, the replacement of the group of first tap coefficients of the first adaptive filter unit 103 with the group of second tap coefficients is performed only once when the transition time-period ends.

Also, in cases where it is judged in the error signal buffer control unit 117 that the degree of estimate precision of the group of first tap coefficients is higher than that of the group of second tap coefficients, the first multiplication factor linearly increased from 0 to 1 and the second multiplication factor linearly decreased from 1 to 0 are output to the first and second multiplying units 118 and 119 in the transition time-period, and the replacement of the group of second tap coefficients of the second adaptive filter unit 105 with the group of first tap coefficients is performed only once when the transition time-period ends.

In the fifth embodiment, when the transition time-period ends, the replacement of the group of first tap coefficients of the first adaptive filter unit 103 with the group of second tap coefficients or the replacement of the group of second tap coefficients of the second adaptive filter unit 105 with the group of first tap coefficients is performed according to the concept of the third embodiment. However, it is applicable that only the replacement of the group of first tap coefficients of the first adaptive filter unit 103 with the group of second tap coefficients be performed according to the concept of the first or second embodiment.

Accordingly, in the fifth embodiment, because the echo canceled output signal is produced in the transition time-period by adding the first error signal multiplied by the first multiplication factor linearly decreased (or increased) and the second error signal multiplied by the second multiplication factor linearly increased (or decreased) when an adaptive filter selection result indicating the selection of the second (or first) adaptive filter unit 105 is sent from the adaptive filter selecting unit 122 to the error signal buffer control unit 117 and because the echo canceled output signal is produced from the first error signal after the transition time-period by performing the tap coefficient replacement when the transition time-period ends, the echo canceling apparatus, in which the discontinuity occurring in the echo canceled output signal in the replacement of the group of tap coefficients is reduced, can be obtained in the same manner as in the fourth embodiment while maintaining the effects obtained in the echo canceling apparatus according to the first to third embodiments. Also, because the linear interpolation based on the time transition is not performed and because the calculation corresponding to the two multiplications performed in the first and second multiplying units 118 and 119 and one addition performed in the adding unit 120 is only increased in the tap coefficient replacement, the calculation volume required to reduce the discontinuity occurring in the echo canceled output signal in the tap coefficient replacement can be reduced.

Embodiment 6

In the first to fifth embodiments, a convergence factor used to renew the group of first tap coefficients in the first adaptive filter unit 103 is the same as that used to renew the group of second tap coefficients in the second adaptive filter unit 105. The convergence factor is called a step gain and is used for the tap coefficient renewal algorithm applied in both the first adaptive filter unit 103 and the second adaptive filter unit 105. However, in a sixth embodiment, a first convergence factor is used to renew the group of first tap coefficients in the first adaptive filter unit 103, and a second convergence factor differing from the first convergence factor is used to renew the group of second tap coefficients in the second adaptive filter unit 105. The configuration of an echo canceling apparatus according to the sixth embodiment is the same as that shown in FIG. 1 according to the first embodiment, so that a drawing of the echo canceling apparatus according to the sixth embodiment is omitted.

In general, in cases where a convergence factor used for the renewal of tap coefficients is made low, a convergence speed of the group of tap coefficients is lowered, but a degradation degree of the group of tap coefficients can be reduced even though the group of tap coefficients is renewed in the double talk state in which the echo component and the near-end signal component are included in the transmission signal. In contrast, in cases where the convergence factor is made high, a degradation degree of the group of tap coefficients based on the renewal in the double talk state becomes high, but a convergence speed of the group of tap coefficients is heightened.

In the sixth embodiment, a value of the first convergence factor used for the first adaptive filter unit 103 is set to a low value, and a value of the second convergence factor used for the second adaptive filter unit 105 is set to a high value.

Figure 9:
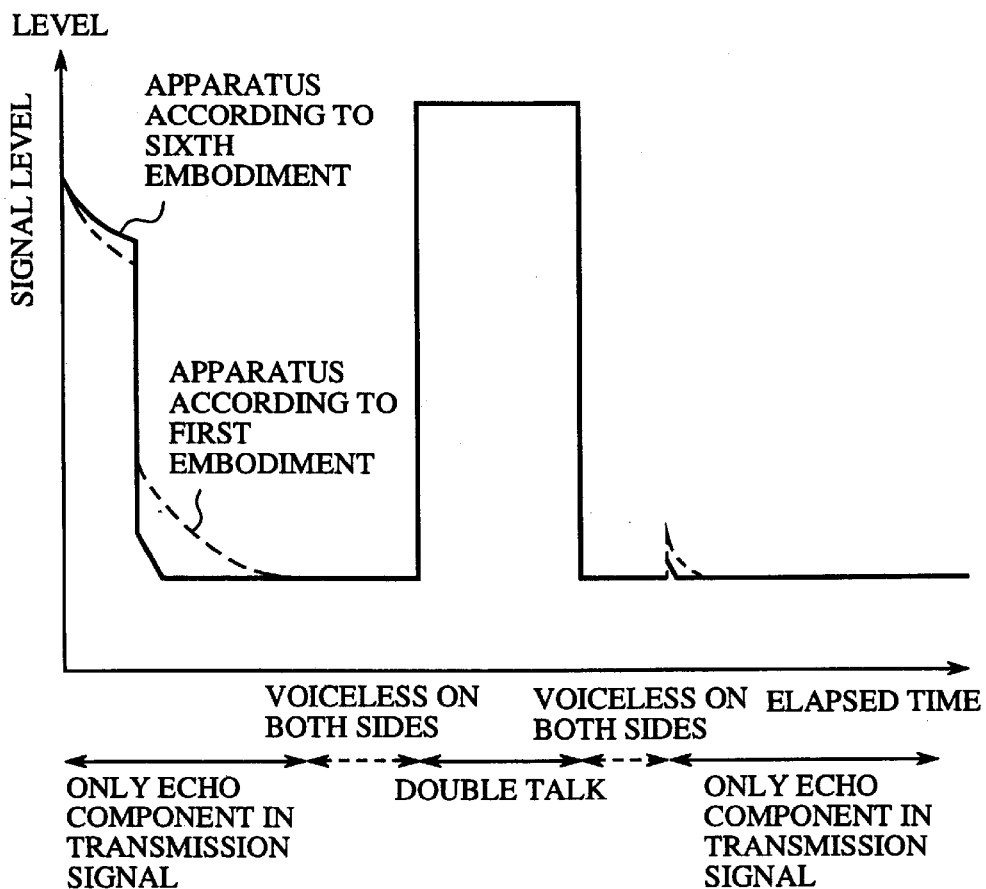
FIG. 9 is an explanatory diagram showing a performance comparison between an echo canceling apparatus of a sixth embodiment and the echo canceling apparatus of the first embodiment.

FIG. 9 is an explanatory diagram showing a performance comparison between the echo canceling apparatus of the sixth embodiment and the echo canceling apparatus of the first embodiment. In FIG. 9, the Y-axis indicates a level (or average power level) of each echo canceled output signal, the X-axis indicates an elapsed time, the level of the echo canceled output signal obtained in the echo canceling apparatus of the sixth embodiment is indicated by a solid line, and the level of the echo canceled output signal obtained in the echo canceling apparatus of the first embodiment is indicated by a dotted line.

As shown in FIG. 9, because the group of second tap coefficients is rapidly converged in the only echo component state, the group of second tap coefficients is used for the production of the echo canceled output signal in the only echo component state under the control of the adaptive filter selecting unit 109, so that the level of the echo canceled output signal can be rapidly lowered as compared with that according to the first embodiment. Also, because the group of first tap coefficients is slowly converged in the double talk state even though the group of first tap coefficients is erroneously renewed in the double talk state, even though the group of first tap coefficients is used for the production of the echo canceled output signal in the double talk state under the control of the adaptive filter selecting unit 109, a degradation degree of the group of first tap coefficients can be moreover reduced in the double talk state. Also, because a degradation degree of the group of first tap coefficients is reduced in the double talk state, the level increase in the echo canceled output signal can be moreover reduced in an only echo component state set after the double talk state as compared with that according to the first embodiment.

Accordingly, in the sixth embodiment, because the value of the first convergence factor used for the first adaptive filter unit 103 differs from the value of the second convergence factor used for the second adaptive filter unit 105 so as to set the first convergence factor to a value lower than that of the second convergence factor, even though the group of first tap coefficients is erroneously renewed in the double talk state, a degradation degree of the group of first tap coefficients can be moreover reduced, so that the echo canceled output signal, in which the echo component is reliably canceled, can be moreover stably obtained. Also, the convergence speed of the group of second tap coefficients can be moreover improved in the only echo component state, even though an echo path change or an infinite return loss occurs, the estimate of the group of second tap coefficients can be moreover rapidly performed as compared with in the first to fifth embodiments, and the echo canceled output signal equivalent to the transmission signal, in which the echo component is canceled, can be always obtained stably regardless of the echo path change or the infinite return loss.

Embodiment 7

In the first to sixth embodiments, the length of the group of first tap coefficients of the first adaptive filter unit 103 is the same as that of the group of second tap coefficients of the second adaptive filter unit 105. In a seventh embodiment, the length of the group of first tap coefficients of the first adaptive filter unit 103 differs from that of the group of second tap coefficients of the second adaptive filter unit 105. The configuration of an echo canceling apparatus according to the seventh embodiment is the same as that shown in FIG. 1 according to the first embodiment, so that a drawing of the echo canceling apparatus according to the seventh embodiment is omitted.

In general, in cases where a convergence speed of tap coefficients is heightened as the length of the group of tap coefficients is shortened on condition that the convergence factor used for the renewal of the group of tap coefficients is not changed.

In the seventh embodiment, the length of the group of second tap coefficients of the second adaptive filter unit 105 is set to be shorter than that of the group of first tap coefficients of the first adaptive filter unit 103. Therefore, the group of second tap coefficients of the second adaptive filter unit 105 is rapidly converted in the only echo component state as compared with the convergence of the group of first tap coefficients of the first adaptive filter unit 103 in the same manner as in the sixth embodiment. Also, a degradation degree of the group of first tap coefficients of the first adaptive filter unit 103 is lower than that of the group of second tap coefficients of the second adaptive filter unit 105 in the double talk state in the same manner as in the sixth embodiment.

Accordingly, in the seventh embodiment, because the length of the group of second tap coefficients of the second adaptive filter unit 105 differs from that of the group of first tap coefficients of the first adaptive filter unit 103 so as to set the length of the group of second tap coefficients to a value lower than that of the group of first tap coefficients, even though an echo path change or an infinite return loss occurs, the estimate of the group of second tap coefficients can be moreover rapidly performed as compared with in the first to fifth embodiments, and the echo canceled output signal equivalent to the transmission signal, in which the echo component is canceled, can be always obtained stably regardless of the echo path change or the infinite return loss.

What is claimed is:

1. An echo canceling apparatus, in which an echo canceled output signal is produced from a reception signal, a transmission signal, a first error signal produced from the reception signal and the transmission signal and a second error signal produced from the reception signal and the transmission signal and is output, comprising:

first adaptive filter renewal control means for receiving the first error signal, the reception signal and the transmission signal and judging according to a first renewal judging method based on the first error signal, the reception signal and the transmission signal whether or not a first tap coefficient is to be renewed;

first adaptive filter means for receiving the first error signal and the reception signal, renewing the first tap coefficient according to the first error signal and the reception signal, in cases where the renewal of the first tap coefficient is judged by the first adaptive filter renewal control means, and producing a first pseudo-echo signal from the first tap coefficient;

first subtracting means for subtracting the first pseudo-echo signal produced by the first adaptive filter means from the transmission signal to produce the first error signal as the echo canceled output signal equivalent to the transmission signal in which an echo component is canceled;

second adaptive filter renewal control means for receiving the reception signal and judging according to a second renewal judging method, which is based on the reception signal and differs from the first renewal judging method, whether or not a second tap coefficient is to be renewed;

second adaptive filter means for receiving the second error signal and the reception signal, renewing the second tap coefficient according to the second error signal and the reception signal, in cases where the renewal of the second tap coefficient is judged by the second adaptive filter renewal control means, and producing a second pseudo-echo signal from the second tap coefficient;

second subtracting means for subtracting the second pseudo-echo signal produced by the second adaptive filter means from the transmission signal to produce the second error signal equivalent to the transmission signal in which the echo component is canceled; and adaptive filter selecting means for receiving the reception signal, the transmission signal, the first error signal produced by the first subtracting means, the second error signal produced by the second subtracting means and the second tap coefficient of the second adaptive filter means and controlling the first adaptive filter means according to a level relationship among the reception signal, the transmission signal, the first error signal and the second error signal to replace the first tap coefficient of the first adaptive filter means with the second tap coefficient.

2. An echo canceling apparatus, in which an echo canceled output signal is produced from a reception signal, a transmission signal, a first error signal produced from the reception signal and the transmission signal and a second error signal produced from the reception signal and the transmission signal and is output, comprising:

first adaptive filter renewal control means for receiving the reception signal and judging according to the reception signal whether or not a first tap coefficient is to be renewed;

first adaptive filter means for receiving the first error signal and the reception signal, renewing the first tap coefficient according to a first tap coefficient renewal algorithm based on the first error signal and the reception signal, in cases where the renewal of the first tap coefficient is judged by the first adaptive filter renewal control means, and producing a first pseudo-echo signal from the first tap coefficient;

first subtracting means for subtracting the first pseudo-echo signal produced by the first adaptive filter means from the transmission signal to produce the first error signal as the echo canceled output signal equivalent to the transmission signal in which an echo component is canceled;

second adaptive filter renewal control means for receiving the reception signal and judging according to a second renewal judging method based on the reception signal whether or not a second tap coefficient is to be renewed;

second adaptive filter means for receiving the second error signal and the reception signal, renewing the second tap coefficient according to a second tap coefficient renewal algorithm, which is based on the second error signal and the reception signal and differs from the first tap coefficient renewal algorithm used by the first adaptive filter means, in cases where the renewal of the second tap coefficient is judged by the second adaptive filter renewal control means, and producing a second pseudo-echo signal from the second tap coefficient;

second subtracting means for subtracting the second pseudo-echo signal produced by the second adaptive filter means from the transmission signal to produce the second error signal equivalent to the transmission signal in which the echo component is canceled; and adaptive filter selecting means for receiving the reception signal, the transmission signal, the first error signal produced by the first subtracting means, the second error signal produced by the second subtracting means and the second tap coefficient of the second adaptive filter means and controlling the first adaptive filter means according to a level relationship among the reception signal, the transmission signal, the first error signal and the second error signal to replace the first tap coefficient of the first adaptive filter means with the second tap coefficient.

3. An echo canceling apparatus according to claim 1, wherein a first tap coefficient renewal algorithm used for the renewal of the first tap coefficient of the first adaptive filter means differs from a second tap coefficient renewal algorithm used for the renewal of the second tap coefficient of the second adaptive filter means.

4. An echo canceling apparatus according to claim 1, wherein the adaptive filter selecting means receives the first tap coefficient of the first adaptive filter means in addition to the reception signal, the transmission signal, the first error signal, the second error signal and the second tap coefficient, and the adaptive filter selecting means controls the first adaptive filter means according to a first level relationship among the reception signal, the transmission signal, the first error signal and the second error signal to replace the first tap coefficient of the first adaptive filter means with the second tap coefficient or controls the second adaptive filter means according to a second level relationship among the reception signal, the transmission signal, the first error signal and the second error signal to replace the second tap coefficient of the second adaptive filter means with the first tap coefficient.

5. An echo canceling apparatus according to claim 2, wherein the adaptive filter selecting means receives the first tap coefficient of the first adaptive filter means in addition to the reception signal, the transmission signal, the first error signal, the second error signal and the second tap coefficient, and the adaptive filter selecting means controls the first adaptive filter means according to a first level relationship among the reception signal, the transmission signal, the first error signal and the second error signal to replace the first tap coefficient of the first adaptive filter means with the second tap coefficient or controls the second adaptive filter means according to a second level relationship among the reception signal, the transmission signal, the first error signal and the second error signal to replace the second tap coefficient of the second adaptive filter means with the first tap coefficient.

6. An echo canceling apparatus according to claim 1, wherein the adaptive filter selecting means controls the first adaptive filter means to replace the first tap coefficient of the first adaptive filter means with the second tap coefficient according to a linear interpolation based on a time transition.

7. An echo canceling apparatus according to claim 2, wherein the adaptive filter selecting means controls the first adaptive filter means to replace the first tap coefficient of the first adaptive filter means with the second tap coefficient according to a linear interpolation based on a time transition.

8. An echo canceling apparatus according to claim 4, wherein the adaptive filter selecting means controls the first adaptive filter means to replace the first tap coefficient of the first adaptive filter means with the second tap coefficient according to a linear interpolation based on a time transition or controls the second adaptive filter means to replace the second tap coefficient of the second adaptive filter means with the first tap coefficient according to a linear interpolation based on a time transition.

9. An echo canceling apparatus according to claim 5, wherein the adaptive filter selecting means controls the first adaptive filter means to replace the first tap coefficient of the first adaptive filter means with the second tap coefficient according to a linear interpolation based on a time transition or controls the second adaptive filter means to replace the second tap coefficient of the second adaptive filter means with the first tap coefficient according to a linear interpolation based on a time transition.

10. An echo canceling apparatus according to claim 1, further comprising:

error signal buffer control means for receiving a judging result indicating the replacement of the first tap coefficient of the first adaptive filter means with the second tap coefficient or a judging result indicating the replacement of the second tap coefficient of the second adaptive filter means with the first tap coefficient from the adaptive filter selecting means and producing a first multiplication factor and a second multiplication factor according to the received judging result;

first multiplying means for multiplying the first error signal produced by the first subtracting means by the first multiplication factor produced by the error signal buffer control means to produce a first multiplied error signal;

second multiplying means for multiplying the second error signal produced by the second subtracting means by the second multiplication factor produced by the error signal buffer control means to produce a second multiplied error signal; and adding means for adding the first multiplied error signal produced by the first multiplying means and the second multiplied error signal produced by the second multiplying means together to obtain a sum of the first multiplied error signal and the second multiplied error signal and outputting the sum as the echo canceled output signal.

11. An echo canceling apparatus according to claim 2, further comprising:

error signal buffer control means for receiving a judging result indicating the replacement of the first tap coefficient of the first adaptive filter means with the second tap coefficient or a judging result indicating the replacement of the second tap coefficient of the second adaptive filter means with the first tap coefficient from the adaptive filter selecting means and producing a first multiplication factor and a second multiplication factor according to the received judging result;

first multiplying means for multiplying the first error signal produced by the first subtracting means by the first multiplication factor produced by the error signal buffer control means to produce a first multiplied error signal;

second multiplying means for multiplying the second error signal produced by the second subtracting means by the second multiplication factor produced by the error signal buffer control means to produce a second multiplied error signal; and adding means for adding the first multiplied error signal produced by the first multiplying means and the second multiplied error signal produced by the second multiplying means together to obtain a sum of the first multiplied error signal and the second multiplied error signal and outputting the sum as the echo canceled output signal.

12. An echo canceling apparatus according to claim 1, wherein a value of a convergence factor used for the renewal of the first tap coefficient of the first adaptive filter means differs from that used for the renewal of the second tap coefficient of the second adaptive filter means.

13. An echo canceling apparatus according to claim 2, wherein a value of a convergence factor used for the renewal of the first tap coefficient of the first adaptive filter means differs from that used for the renewal of the second tap coefficient of the second adaptive filter means.

14. An echo canceling apparatus according to claim 1, wherein a length of the first tap coefficient of the first adaptive filter means differs from that of the second tap coefficient of the second adaptive filter means.

15. An echo canceling apparatus according to claim 2, wherein a length of the first tap coefficient of the first adaptive filter means differs from that of the second tap coefficient of the second adaptive filter means.

* * * * *